US008860346B2

(12) United States Patent
Shimizu et al.

(10) Patent No.: US 8,860,346 B2
(45) Date of Patent: Oct. 14, 2014

(54) ANGLE DETECTION DEVICE, MOTOR DRIVING DEVICE, AND IMAGE FORMING APPARATUS

(71) Applicants: Fumihiro Shimizu, Kanagawa (JP);
Haruyuki Suzuki, Kanagawa (JP);
Tomohiko Kamatani, Hyogo (JP);
Katsuhisa Furuse, Hyogo (JP)

(72) Inventors: Fumihiro Shimizu, Kanagawa (JP);
Haruyuki Suzuki, Kanagawa (JP);
Tomohiko Kamatani, Hyogo (JP);
Katsuhisa Furuse, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 13/649,528

(22) Filed: Oct. 11, 2012

(65) Prior Publication Data
US 2013/0099708 A1    Apr. 25, 2013

(30) Foreign Application Priority Data

Oct. 25, 2011 (JP) ................................. 2011-233788
Sep. 4, 2012 (JP) ................................. 2012-194012

(51) Int. Cl.
*H02K 29/08* (2006.01)
*G01D 5/245* (2006.01)
*H02P 21/14* (2006.01)

(52) U.S. Cl.
CPC ............ *H02P 21/146* (2013.01); *G01D 5/2451* (2013.01)
USPC .................. 318/400.39; 318/400.01; 318/701

(58) Field of Classification Search
CPC ... H02P 21/146; H02P 21/14; H02P 21/0039; H02P 6/165; B60L 15/025; B60L 2240/12; B60L 2240/421; B60L 2240/423; Y02T 10/643
USPC ................. 318/400.01, 701, 400.39
See application file for complete search history.

(56) References Cited

U.S. PATENT DOCUMENTS

| 3,686,956 | A  | * | 8/1972 | Simpkin et al. ................. 73/462 |
| 4,072,884 | A  | * | 2/1978 | Treadwell ................ 318/400.04 |
| 6,088,246 | A  | * | 7/2000 | Okuyama et al. ............... 363/41 |
| 6,552,453 | B2 | * | 4/2003 | Ohiwa et al. ................. 310/68 B |
| 6,791,219 | B1 | * | 9/2004 | Eric et al. ..................... 310/68 B |
| 7,792,214 | B2 | * | 9/2010 | Matsuura et al. ............. 375/297 |
| 7,899,127 | B2 | * | 3/2011 | Schenk ......................... 375/261 |
| 8,258,731 | B2 | * | 9/2012 | Shimizu .................. 318/400.09 |
| 2010/0117576 | A1 |  | 5/2010 | Shimizu |
| 2011/0089874 | A1 |  | 4/2011 | Shimizu |

FOREIGN PATENT DOCUMENTS

JP         4111813      7/2008
JP       2011-087440    4/2011

* cited by examiner

*Primary Examiner* — Rita Leykin
(74) *Attorney, Agent, or Firm* — Oblon, Spivak, McClelland, Maier & Neustadt, L.L.P.

(57) ABSTRACT

Disclosed is an angle detection device including plural sensors that output corresponding sinusoidal signals, wherein each of the sinusoidal signals varies sinusoidally depending on a rotational angle of a rotor of a motor, and each of the sinusoidal signals has a phase that depends on a position of the corresponding sensor; a vector generating unit that generates a vector represented by a result of mutually operating at least two of the sinusoidal signals; a vector rotation unit that rotates the vector by operating the vector and reference sine waves having corresponding phases; and an angle search unit that causes the vector rotation unit to sequentially rotate the vector until a phase of the vector becomes a predetermined phase, and that detects an angle between the vector prior to being rotated and the predetermined phase as the rotational angle of the rotor of the motor.

9 Claims, 23 Drawing Sheets

ROTATIONAL ANGLE : $-\theta 1=-180°$ $\theta$ d[5:0] | bit5 | | | | | bit0 |
| 1 | 0 | 0 | 0 | 0 | 0 |

DETERMINE VALUE OF BIT 5 BASED ON
RESULT OF ROTATION: Vy'(1) > 0

$\theta$ d[5:0] | bit5 | | | | | bit0 |
| 1 | 0 | 0 | 0 | 0 | 0 |

ROTATIONAL ANGLE : $-\theta 1 - \theta 2 = -180° - 90°$ $\theta$ d[5:0]  | bit5 | | | ··· | | bit0 |
| 1 | 1 | 0 | 0 | 0 | 0 |

DETERMINE VALUE OF BIT 4 BASED ON
RESULT OF ROTATION: $Vy'(2) < 0$ $\theta$ d[5:0] | bit5 | | | ··· | | bit0 |
| 1 | 0 | 0 | 0 | 0 | 0 |

ROTATIONAL ANGLE : $-\theta 1 - \theta 2 + \theta 3 = -180° - 90° + 45°$

| | bit5 | | | ··· | | bit0 |
|---|---|---|---|---|---|---|
| $\theta$ d[5:0] | 1 | 0 | 1 | 0 | 0 | 0 |

DETERMINE VALUE OF BIT 3 BASED ON
RESULT OF ROTATION: Vy'(3) < 0

| | bit5 | | | ··· | | bit0 |
|---|---|---|---|---|---|---|
| $\theta$ d[5:0] | 1 | 0 | 0 | 0 | 0 | 0 |

ROTATIONAL ANGLE : $-\theta 1 - \theta 2 + \theta 3 + \theta 4$
$= -180° - 90° + 45° + 22.5°$ $\theta$ d[5:0]   bit5 ··· bit0
              | 1 | 0 | 0 | 1 | 0 | 0 |

DETERMINE VALUE OF BIT 2 BASED ON
RESULT OF ROTATION: Vy'(4) > 0

$\theta$ d[5:0]   bit5 ··· bit0
              | 1 | 0 | 0 | 1 | 0 | 0 |

FIG.9

| θd[1:0] | | ENCA | ENCB |
|---|---|---|---|
| bit1 | bit0 | | |
| 0 | 0 | H | L |
| 0 | 1 | H | H |
| 1 | 0 | L | H |
| 1 | 1 | L | L |

(H:High, L:Low)

|    |    | OUTPUT VALUES AND CONDITIONS | |
|----|----|------|------|
|    |    | High | Low |
| HG | HU | HU+≧HU− | HU+<HU− |
|    | HV | HV+≧HV− | HV+<HV− |
|    | HW | HW+≧HW− | HW+<HW− |

FIG.17

|  | UPPER GATE SIGNAL YH | LOWER GATE SIGNAL YL |
|---|---|---|
| PWM-PHASE | XH | XL |
| LOW-PHASE | ALWAYS LO | ALWAYS HI |
| HIZ-PHASE | ALWAYS LO | ALWAYS LO |

(Y: U, V, W)

ANGLE DETECTION DEVICE, MOTOR DRIVING DEVICE, AND IMAGE FORMING APPARATUS

BACKGROUND OF THE INVENTION

1. Field of the Invention

Embodiments of the present invention relate to an angle detection device that detects a rotational angle of a rotor of a motor, a motor driving device that rotationally drives the motor including the angle detection device, and an image forming apparatus.

2. Description of the Related Art

When rotational position control is performed for a motor, a rotational angle of a rotor is detected. In general, the rotational angle of the rotor of the motor can be detected by connecting a rotary encoder to a rotational shaft of the rotor of the motor. In this case, two-phase pulse signals are obtained from the rotary encoder. A phase difference between the two-phase pulse signals is a 1/4 period. The two-phase signals vary depending on the rotational angle of the rotor of the motor. The relative rotational angle of the rotor of the motor is detected based on a result of detecting edges of the two-phase pulse signals and a High/Low state which has two phases.

An optical encoder is an example of the rotary encoder. The optical encoder includes a disk and two photo interrupters. In the disk, slits, which serve as optical windows, are provided at a periphery while the slits are evenly spaced apart. The two photo interrupters are separately arranged by an interval which is a quarter of the slit pitch of the disk. The two-phase pulse signals are obtained by binarizing output signals from the two photo interrupters.

In the invention disclosed in Patent Document 1 (Japanese Registered Patent No. 4111813), two magnetic sensors are disposed. The two magnetic sensors output corresponding signals that sinusoidally vary depending on the rotational angle of the rotor of the motor. A phase difference between the signals output from the corresponding two magnetic sensors is 90 degrees. Here, the rotational angle of the rotor of the motor is denoted by $\theta$. Among the two-phase output signals that are obtained from the magnetic sensors, an X-phase signal is denoted by Vx, and a Y-phase signal is denoted by Vy. In this case, the Vx can be represented by a cosine function having an amplitude of Ax with respect to the rotational angle $\theta$, and the Vy can be represented by a sine function having an amplitude of Ay with respect to the rotational angle $\theta$. The cosine function and the sine function are shown, for example, in FIG. 19. They are also expressed by Expression 1 that represents two-phase sine signals. In general, the amplitudes Ax and Ay of the signals output from the corresponding magnetic sensors are different. However, the amplitudes Ax and Ay have been adjusted in advance, and it is assumed that Ax=Ay.

$$\begin{cases} V_X = A_X * \cos(\theta) \\ V_Y = A_Y * \sin(\theta) \end{cases} \quad \text{[Expression 1]}$$

When the values Vx and Vy of the signals output from the corresponding magnetic sensors are detected, an angle between a vector formed by the detected Vx and Vy on the XY plane and the X-axis corresponds to the rotational angle $\theta$ of the rotor of the motor. Therefore, the vector (Vx, Vy) is rotated in the negative rotational direction by repeatedly applying a rotational transform expressed by Expression 2, until the y-component of the rotated vector Vy'(n) changes to a negative value from a positive value. As shown in FIG. 20, each time the rotational transform is applied, the vector is rotated by a step angle of "$\theta$step." The rotational transform expressed by Expression 2 shows an angle search algorithm. The total rotational angle $\theta$n of the thus obtained vector is the detected value of the rotational angle of the rotor of the motor. By periodically performing the above-described operations, the rotational angle of the rotor of the motor can be detected.

$$\begin{bmatrix} V'_X(n) \\ V'_Y(n) \end{bmatrix} = \begin{bmatrix} \cos\theta_n & \sin\theta_n \\ -\sin\theta_n & \cos\theta_n \end{bmatrix} \begin{bmatrix} V'_X(n-1) \\ V'_Y(n-1) \end{bmatrix} \quad \text{[Expression 2]}$$

$$V'_X(0) = V_X,$$
$$V'_Y(0) = V_Y$$
$$\theta_n = n * \theta_{step}$$
$$(n = 1, 2, 3, \dots )$$

However, for the optical encoder, the components such as the slit disk and the photo interrupters are utilized. Further, these components are assembled. Consequently, the cost is increased.

Further, in the method described in Patent Document 1, for example, a brushless motor includes plural Hall elements that are arranged to output signals that are evenly shifted by a predetermined phase, so as to detect timing to switch the current. However, in the most commonly used three-phase brushless motor, the Hall elements for switching the current are arranged so that output signals are evenly shifted by a phase of 120 degrees. In such a case, in order to detect the rotational angle of the rotor of the motor, Hall elements may be added so as to output signals that are evenly shifted by a phase of 90 degrees. In a general-purpose motor unit, the coils, the rotor, and the Hall elements, which are arranged to output the signals that are evenly shifted by the phase of 120 degrees, are integrally assembled. Therefore, such a general-purpose motor unit may not be used, and consequently the cost may be increased.

An objective of the embodiments of the present invention is to provide an angle detection device that can stably and accurately detect an angle of a rotor of a motor, without an increase of cost, such as due to additional components.

SUMMARY OF THE INVENTION

In one aspect, there is provided an angle detection device including plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor; a vector generating unit configured to generate a vector represented by a result of mutually operating at least two of the sinusoidal signals; a vector rotation unit configured to rotate the vector by operating the vector and reference sine waves having corresponding phases; an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

With the angle detection device according to the embodiment, the rotational angle of the rotor can be stably and accurately detected without introducing an expensive optical encoder. Further, it is possible to detect the rotational angle of the rotor of the motor even for a case where the phase difference of the sinusoidal waves output from the corresponding sensors is not 90 degrees.

In another aspect, there is provided a motor driving device configured to rotationally drive a motor by applying periodically varying driving voltages to terminals of the motor, the motor driving device including an angle detection device including plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor; a vector generating unit configured to generate a vector represented by a result of mutually operating at least two of the sinusoidal signals; a vector rotation unit configured to rotate the vector by operating the vector and reference sine waves having corresponding phases; and an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

In another aspect, there is provided an image forming apparatus including a motor driving device configured to rotationally drive a motor by applying periodically varying driving voltages to terminals of the motor, wherein the motor driving device includes an angle detection device, wherein the angle detection device includes plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor; a vector generating unit configured to generate a vector represented by a result of mutually operating at least two of the sinusoidal signals; a vector rotation unit configured to rotate the vector by operating the vector and reference sine waves having corresponding phases; and an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

Other objects, features and advantages of the present invention will become more apparent from the following detailed description when read in conjunction with the accompanying drawings.

BRIEF DESCRIPTION OF THE DRAWINGS

FIG. 9 is a diagram showing generating logic of two-phase pulse signals;

FIG. 17 is a diagram showing a relationship between the temporal logic and gate signals;

DETAILED DESCRIPTION OF THE PREFERRED EMBODIMENTS

Hereinafter, there will be explained a configuration of devices according to a first embodiment of the present invention by referring to figures.

Figure 2:
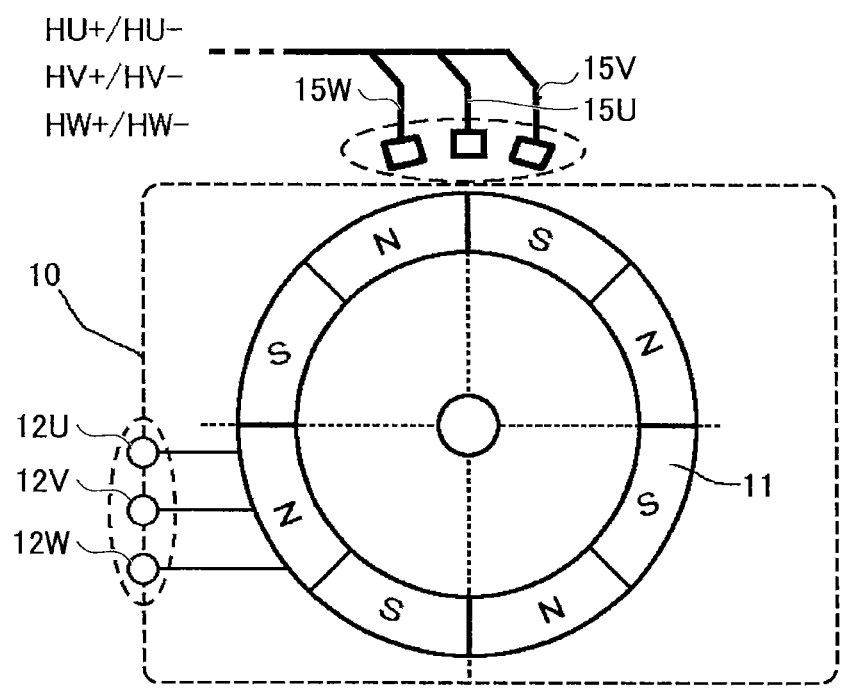
FIG. 2 is a schematic configuration diagram of a motor unit including Hall elements.
Figure 12:
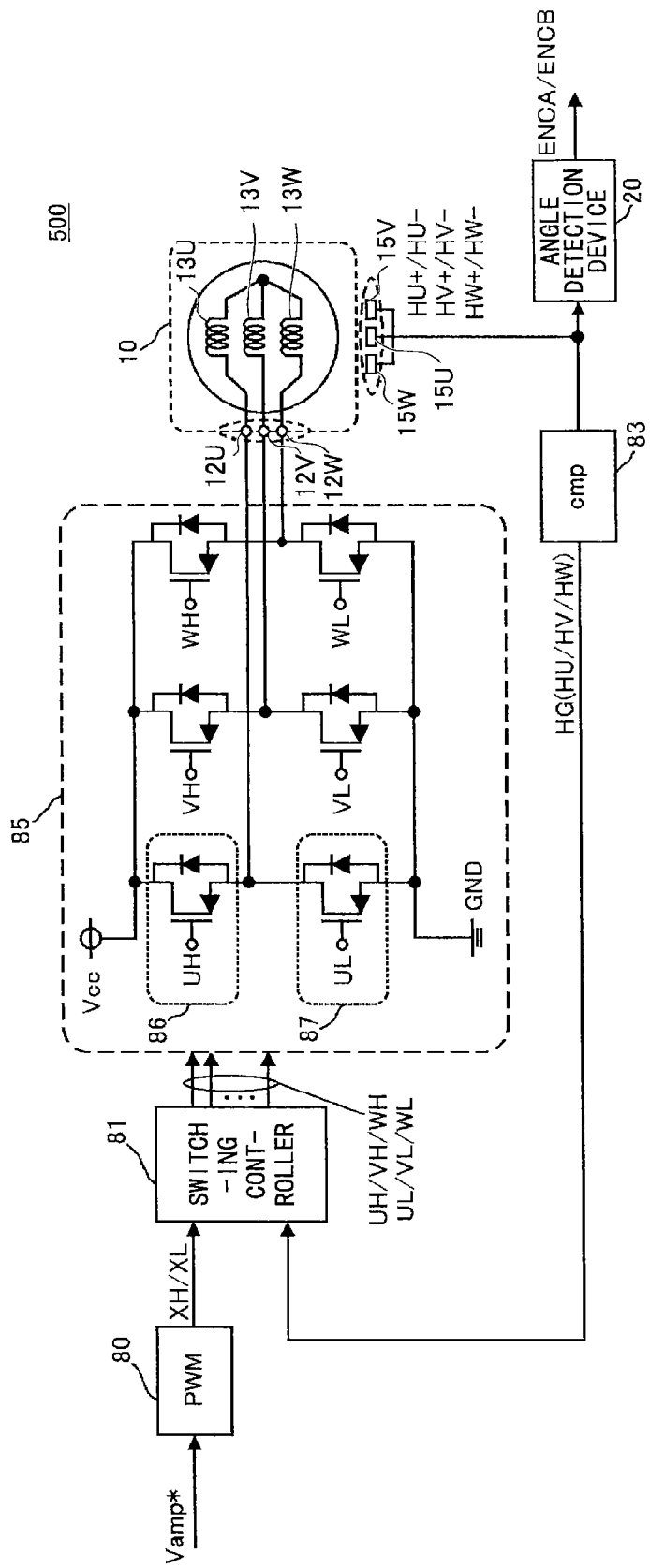
FIG. 12 is an overall configuration diagram of a motor driving device according to a third embodiment.

A brushless motor 10 shown in FIG. 2 includes coils 13U, 13V, and 13W (not shown in FIG. 2; cf. FIG. 12). The coils 13U, 13V, and 13W are star connected and correspond to three phases of a U-phase, a V-phase, and a W-phase, respectively. The U-phase, the V-phase, and the W-phase are shifted by a phase shift of 120 degrees one to another. The brushless motor 10 further includes a rotor 11 disposed to face the coils 13U, 13V, and 13W. The rotor 11 includes a permanent magnet in which south poles and north poles are alternately arranged. The brushless motor 10 is rotationally driven by supplying currents which are suitably switched (driving currents) from coil terminals 12U, 12V, and 12W to the corresponding coils 13U, 13V, and 13W (the details will be explained later along with FIGS. 12-17). As shown in FIG. 2, the rotor 11 according to the first embodiment includes eight poles (the number of the pairs of the poles is four).

Figure 3:
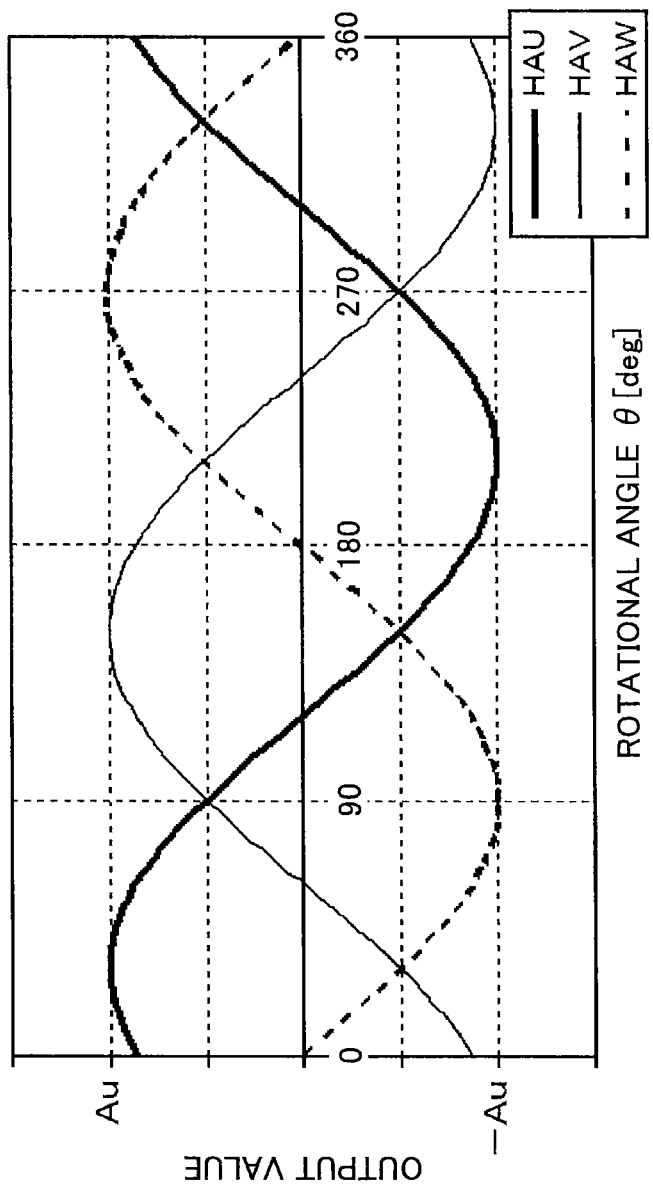
FIG. 3 is a diagram showing differential output signals from the corresponding Hall elements.

Further, as shown in FIG. 2, three Hall elements 15U, 15V, and 15W are fixedly disposed in the vicinity of the rotor 11. The Hall elements 15U, 15V, and 15W detect a rotational angle of the rotor 11. The Hall elements 15U, 15V, and 15W output corresponding differential signals HU+/HU−, HV+/HV−, and HW+/HW− of the U-phase, the V-phase, and the W-phase, which vary in response to a change of a magnetic field from the rotor 11. By converting the differential signals HU+/HU−, HV+/HV−, and HW+/HW− into single-ended signals, analog Hall signals HAU, HAV, and HAW are obtained. As shown in FIG. 3, the analog Hall signals HAU, HAV, and HAW sinusoidally vary depending on the rotation of the rotor 11. The Hall elements 15U, 15V, and 15W are arranged so that the analog Hall signals HAU, HAV, and HAW are shifted by the phase shift of 120 degrees one to another. In FIG. 3, amplitudes of the three phases are hypothetically shown to be equal.

At this time, since the number of magnetic poles included in the rotor 11 according to the first embodiment is eight, four periods of the sine waves shown in FIG. 3 are generated per one rotation of the rotor 11. In other words, a quarter rotation of the rotor 11 corresponds to one period of each of the sine waves shown in FIG. 3. For the sake of convenience of the explanation, hereinafter the rotational angle (θ) of the rotor 11 of the brushless motor 10 is indicated by setting one period of each of the sine waves of the analog Hall signals HAU, HAV, and HAW to be 360 degrees. Accordingly, the actual rotational angle of the rotor 11 of the brushless motor 10 is a quarter of the value (θ) which is indicated while setting one period of each of the sine waves of the analog Hall signals HAU, HAC, and HAW to be 360 degrees. For example, when the value (θ) of the rotational angle, which has been indicated while setting one period of each of the sine waves of the analog Hall signals HAU, HAC, and HAW to be 360 degrees, is 360 degrees, the actual rotational angle of the rotor 11 of the brushless motor 10 is 90 degrees, which is a quarter of 360 degrees.

In order to drive the Hall element 15U, a voltage is applied perpendicular to an output direction of the corresponding differential signal and a direction of corresponding magnetic flux (not shown in FIG. 2). Similarly, to drive the Hall element 15V, a voltage is applied perpendicular to an output direction of the corresponding differential signal and a direction of corresponding magnetic flux; and to drive the Hall element 15W, a voltage is applied perpendicular to an output direction of the corresponding differential signal and a direction of corresponding magnetic flux (not shown in FIG. 2).

The Hall elements 15U, 15V, and 15W correspond to plural sensors that output the sinusoidal signals that vary depending on the rotational angle of the rotor and that have the corresponding phases depending on the positions of the sensors.

Figure 1:
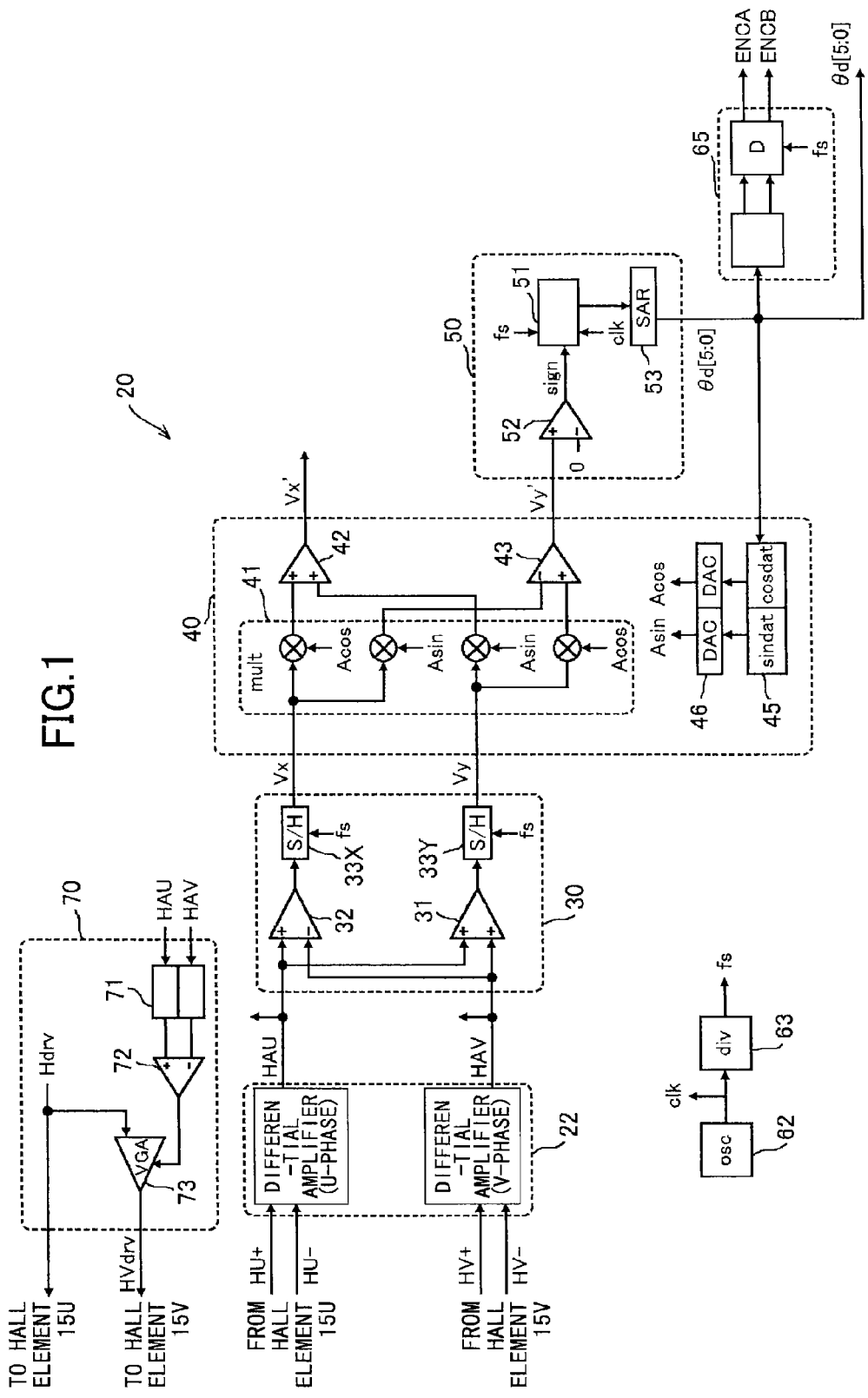
FIG. 1 is a configuration diagram of an angle detection device according to a first embodiment.

Next, there will be explained a configuration of an angle detection device 20 according to the first embodiment by referring to FIG. 1.

The angle detection device 20 includes, at least, a differential amplifier 22; a vector generating unit 30; a vector rotation unit 40; an angle search control unit 50; a two-phase pulse generator 65; a Hall-element drive unit 70; an oscillator 62; and a frequency divider 63.

The oscillator 62 outputs a clock signal clk, which is a periodic pulse signal. The frequency divider 63 divides the clock signal clk, and outputs a trigger fs. Here, a division ratio is set to be longer than a word length of detected angle data θd (which will be explained later), so that the division ratio does not contradict an angle search sequence, which will be described later.

When the Hall elements 15U, 15V, and 15W of the brushless motor 10 input differential signals to the differential amplifier 20, the differential amplifier 20 converts a U-phase differential signal HU+/HU− and a V-phase differential signal HV+/HV− into corresponding single end signals, and outputs the corresponding single end signals as the analog Hall signals HAU and HAV. At this time, waveforms of the analog Hall signals HAU and HAV are represented by "Expression 3," which shows differential output waveforms of the three-phase Hall element. Namely, the waveforms of the analog Hall signals HAU and HAV are represented by the two sinusoidal signals having different phases with respect to the rotational angle θ of the rotor 11. The rotational angle θ of the rotor 11 is indicated while setting the one period of each of the sine waves of the analog Hall signals HAU, HAV, and HAW as 360 degrees (hereinafter, the rotational angle θ of the rotor 11 is simply referred to as "the rotational angle θ"). Here, amplitudes of the HAU and the HAV are denoted as Au and Av, respectively.

$$\begin{cases} HAU = Au*\sin\left(\theta + \dfrac{\pi}{3}\right) \\ HAV = Av*\sin\left(\theta - \dfrac{\pi}{3}\right) \end{cases} \quad \text{[Expression 3]}$$

Next, there will be explained a configuration and operations of the vector generating unit 30.

The vector generating unit 30 is connected to the differential amplifier 22 as a unit for generating vectors. The vector generating unit 30 applies the subtraction operation indicated in the left hand side of the upper formula in "Expression 4" to the analog Hall signals HAU and HAV by using a subtraction amplifier 32, and subsequently the vector generating unit 30 obtains a result of an operation, where the result of the subtraction is multiplied by a gain of (1/√3). The thus obtained result of the operation is sample-held by an S/H unit 33X at timing of the trigger fs, and the result is output as an X-axis output Vx. Similarly, the vector generating unit 30 obtains a result of applying the addition indicated in the left hand side of the bottom formula of "Expression 4" to the analog Hall signals HAU and HAV by using a summing amplifier 31. The thus obtained result of the operation is sample-held by an S/H unit 33Y at the timing of the trigger fs, and the result is output as a Y-axis output Vy.

Figure 4:
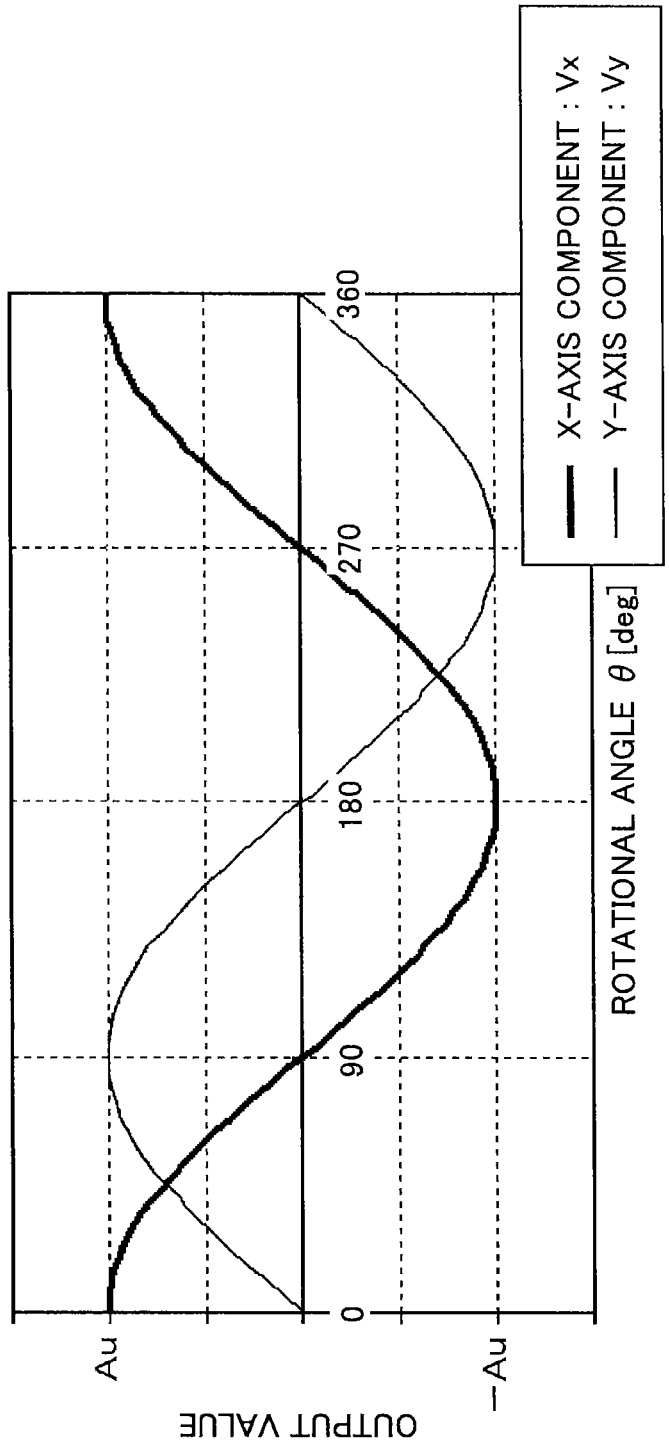
FIG. 4 is a diagram showing an X-axis output Vx and a Y-axis output Vy of a result of a mutual operation.

As shown in the right hand side of the formulae of "Expression 4" and in FIG. 4, the X-axis output Vx and the Y-axis output Vy vary sinusoidally with respect to the rotational angle θ, while they are shifted by a phase shift of 90 degrees one to another. Here, the amplitudes Au and Av of the analog Hall signals HAU and HAV are adjusted to be equal to each other by an amplitude adjusting process by the Hall-element driver 70.

$$\begin{cases} (HAU - HAV)/\sqrt{3} = Au*\cos(\theta) \\ HAU + HAV = Au*\sin(\theta) \end{cases} \text{(if } Au = Av) \quad \text{[Expression 4]}$$

Figure 5:
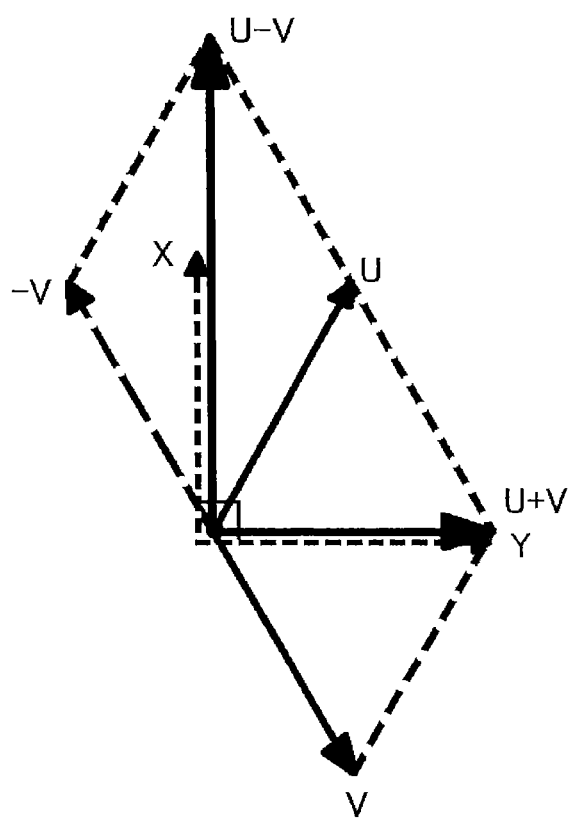
FIG. 5 is a diagram showing a transformation from UVW axes to XY axes according to the first embodiment.

Hereinafter, there will be explained the meanings of the operations indicated by the corresponding formulae of "Expression 4" by referring to FIG. 5.

On the XY plane where the X-axis and the Y-axis are orthogonal to each other, a U-axis is defined to be a line in a direction of +60 degrees with respect to the Y-axis, and a V-axis is defined to be a line in a direction of −60 degrees with respect to the Y-axis. When the unit vector having a length of 1 on the U-axis is denoted by U and the unit vector having a length of 1 on the V-axis is denoted by V, the vector (U+V) is a unit vector Y on the Y-axis, and the vector (U−V) is a vector having a length of √3 on the X-axis. Namely, "Expression 4," which indicates mutual operations of the HAU and HAV, represents a coordinate transformation from the UV-axis system to the XY-axis system. The coefficient of $1/\sqrt{3}$ is multiplied with (HAU-HAV) so as to equalize the length subsequent to the transformation.

The vector represented by the X-axis component of Vx and the Y-axis component of Vy is "a vector that is represented by a result of mutually operating the sinusoidal signals." Namely, as it is clear from FIG. 4, the vector represented by the X-axis component of Vx and the Y-axis component of Vy is the vector represented by the right hand side of the formulae of "Expression 4," i.e., the vector represented by Au*cos(θ) and Au*sin(θ). Further, as shown in the left hand side of the formulae of "Expression 4," Au*cos(θ) and Au*sin(θ) are obtained by the addition and subtraction operations (mutual operations), and as indicated by "Expression 3," HAU and HAV are sinusoidal signals, respectively.

Next, there will be explained a configuration and operations of the vector rotation unit 40.

The vector rotation unit 40 is connected to the vector generating unit 30 as a unit for rotating a vector. The vector rotation unit 40 applies a rotational transformation, which is in accordance with a value of detected angle data θd described later, to a vector represented by the X-axis component of Vx and the Y-axis component of Vy, and outputs a rotated X-axis component Vx' and a rotated Y-axis component Vy'.

Figure 6:
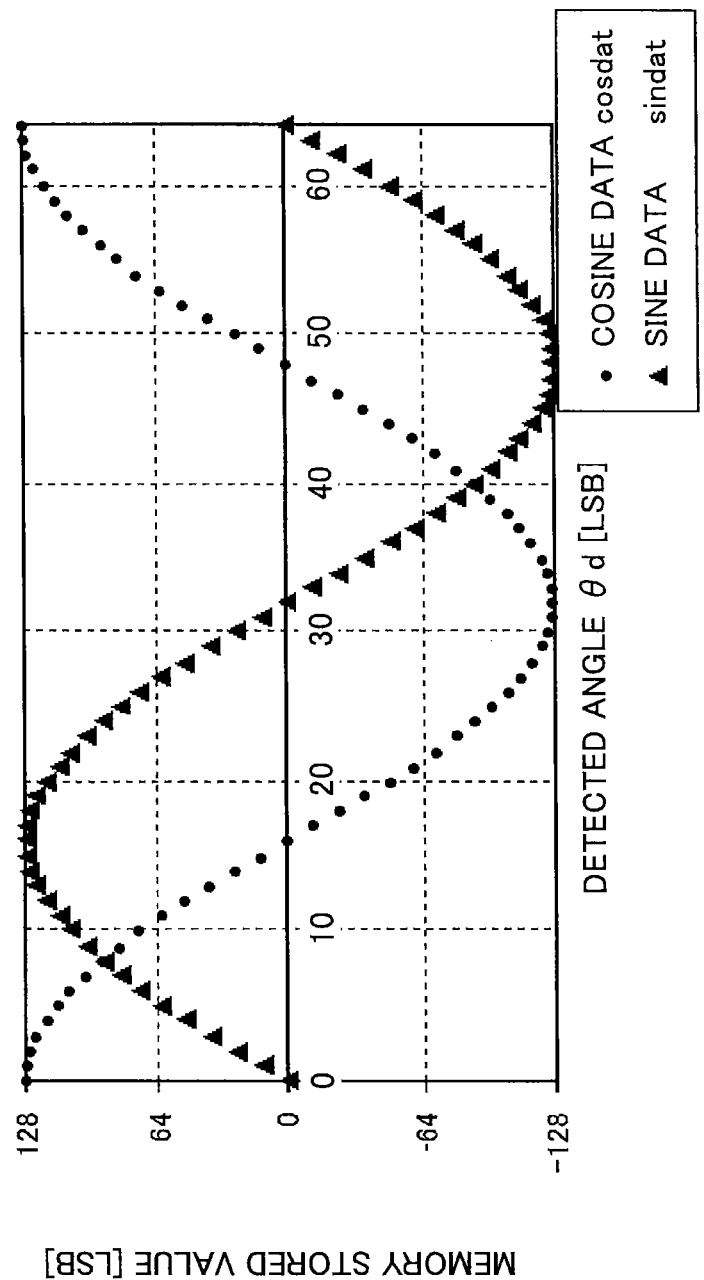
FIG. 6 is a diagram showing sine data and cosine data stored in a memory according to the first embodiment.

A memory 45 is a non-volatile memory. As shown in FIG. 6, one period of each of the sinusoidal signals is divided into 64 pieces, and values of the amplitudes of the sinusoidal signals are stored as sine data (sin dat) and cosine data (cos dat). In the sine data and cosine data, the amplitudes are represented by 128 (LSB). The memory 45 outputs values of the sine data and cosine data that correspond to the value of the detected angle data θd. The value of the detected angle data θd has a word length of 6 bits as described below.

A digital-to-analog converter (DAC) 46 converts data values (sin dat and cos dat) output from the memory 45 into analog values that are proportional to the data values. The DAC 46 outputs the analog values as analog sine values (A sin) and analog cosine values (A cos). At this time, offsets may be added to the output values.

Multipliers 41 are analog multipliers. The multipliers 41 output four multiplication results, where the X-axis component Vx or the Y-axis component Vy is multiplied with the analog sine value A sin or the analog cosine value A cos.

A summing amplifier 42 adds predetermined two results among the four multiplication results of the multipliers 41, and outputs the added results as the rotated X-axis component Vx'. Here, a gain may be multiplied with the Vx'.

A subtraction amplifier 43 subtracts one of the other predetermined two results among the four multiplication results of the multipliers 41 from the other, and outputs the subtracted results as the rotated Y-axis component Vy'. Here, a gain may be multiplied with the Vy'.

Next, there will be explained the details of the operations of the vector rotation unit 40.

The rotated X-axis component Vx' is a value such that the result of the multiplication of the X-axis component Vx with the analog cosine value A cos is added to the result of the multiplication of the Y-axis component Vy with the analog sine value A sin. Namely, the operation Vx'=A cos·Vx+A sin·Vy is performed for the rotated X-axis component Vx. The rotated Y-axis component Vy' is a value such that the result of the multiplication of the X-axis component Vx with the analog sine value A sin is subtracted from the result of the multiplication of the Y-axis component Vy with the analog cosine values A cos. Namely, the operation Vy'=−A sin·Vx+A cos·Vy is performed for the rotated Y-axis component Vy'.

Here, the operation indicated in "Expression 5" is a linear transformation that rotates the vector (Vx, Vy) to the vector (Vx', Vy') in the clockwise direction by the angle θ. According to "Expression 5," Vx' and Vy' are obtained by Vx'=cos θ·Vx+sin θ·Vy and Vy'=−sin θ·Vx+cos θ·Vy, respectively. Similar to the operation of the formula of "Expression 5," the operation by the vector rotation unit 40 corresponds to rotating the vector represented by the X-axis component Vx and the Y-axis component Vy by the value of the detected angle data θd in the clockwise direction.

$$\begin{pmatrix} Vx' \\ Vy' \end{pmatrix} = \begin{pmatrix} \cos\theta & \sin\theta \\ -\sin\theta & \cos\theta \end{pmatrix} \begin{pmatrix} Vx \\ Vy \end{pmatrix} \quad \text{[Expression 5]}$$

In the configuration according to the embodiment, the four multipliers 41 are arranged. However, one multiplier may be alternately used in the time series. Further, instead of the analog multipliers that are used as the multipliers 41, a digital multiplier may be used. Here, in the digital multiplier, all the multipliers 41 are realized by digital circuits. In such a case, analog-to-digital conversions of the signals may be required in accordance with the configuration of the digital circuit.

Here, the analog sine values A sin and the analog cosine values A cos in the embodiment correspond to the reference sine waves having plural phases.

Next, there will be explained a configuration and operations of the angle search control unit 50.

Each time the trigger fs is received, the angle search control unit 50 performs an operation to search for a detection angle, in which the rotated Y-axis component Vy' becomes approximately zero, by varying the detected angle data θd.

A sign determination unit 52 determines whether the value of the rotated Y-axis component Vy' is plus or minus, and outputs a sign determination result (sign). In FIG. 1, zero is used as the reference value. However, the sign may be determined depending on whether the rotated Y-axis component Vy' is greater than or equal to a predetermined offset value.

A SAR 53 is a successive approximation register. The value of the SAR 53 is suitably overwritten by a sequencer 51 described later. The SAR 53 outputs the overwritten value as the detected angle data θd. In this embodiment, the data word length is 6 bits.

The sequencer 51 overwrites the value of the SAR 53. The sequencer 51 performs an angle detection sequence each time the trigger fs is received. The angle detection sequence determines the value of the SAR 53 based on the value of the sign determination result (sign) which varies in accordance with the overwriting of the value of the SAR 53.

Hereinafter, there will be explained details of the operations of the sequencer 51 by referring to FIG. 7 and FIGS. 8A-8D.

Figure 7:
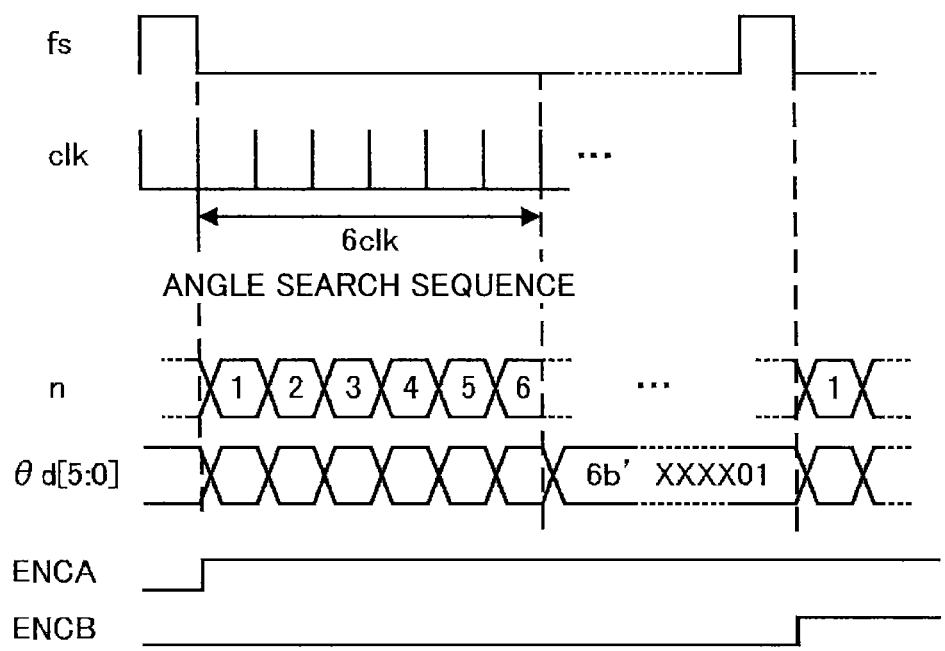
FIG. 7 is a diagram showing a timing chart of an angle search sequence according to the first embodiment.
Figure 8A:
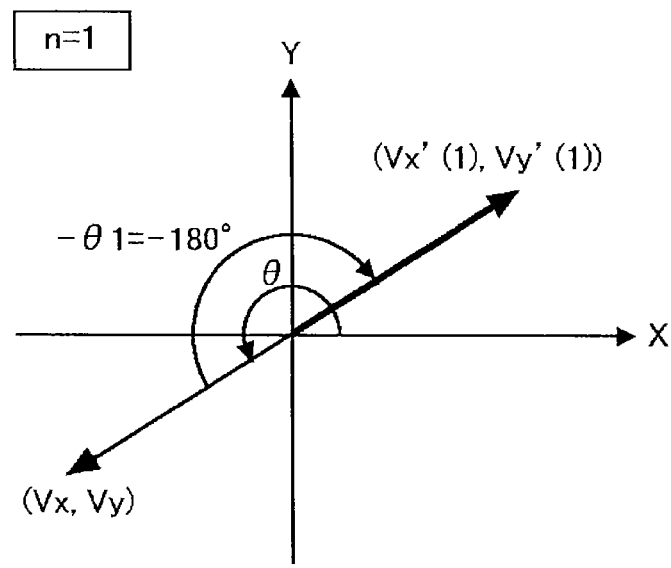
FIG. 8A is a diagram showing an operation of the angle search sequence (count n=1) according to the first embodiment.

When the trigger fs from the frequency divider 63 is received by the sequencer 51, a count n is set to be 1 as shown in FIG. 7. Further, as shown in FIG. 8A, only a value of a bit 5, which is the most significant bit of the SAR 53, is set to be 1, and the other values are set to be zero as shown in FIG. 8A. Here and in the following, overwriting the value of the SAR 53 is equivalent to changing the value of the detected angle data θd. At this time, the value of the SAR 53 is changed from a state where all the six bits are zero to the state where only the value of the bit 5 is one, as described above. In response to this, the detection angle data θd is changed, and thereby the vector (Vx, Vy) is rotated clockwise by θ1=180 degrees by the vector rotation unit 40. The θ1 (=180 degrees) is a vector rotation amount corresponding to the change of the state from the state where all the six bits are zero to the state where only the value of the bit 5 has been changed to be one. Here, the rotated X-axis component Vx' and the rotated Y-axis component Vy' are denoted by Vx'(1) and Vy'(1), respectively. The sequencer 51 detects the sign of Vy'(1) by the sign determination result (sign). In the example of FIG. 8A, the sign of Vy'(1) is plus. In this manner, when the sign of Vy'(1) is plus, the bit 5, which is the most significant bit of the SAR 53, is determined to be one, as it is.

Figure 8B:
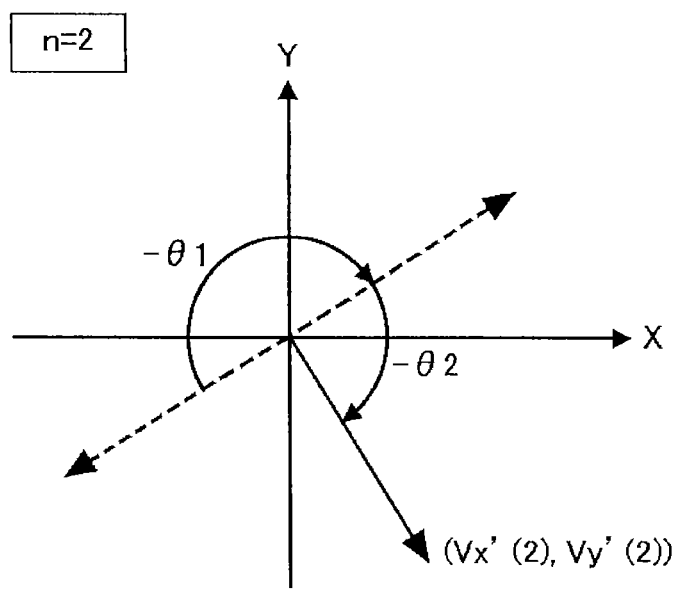
FIG. 8B is a diagram showing the operation of the angle search sequence (count n=2) according to the first embodiment.

When the next clock clk is received, the count n is set to be two as shown in FIG. 7, and a value of a bit 4, which is one bit from the most significant bit of the SAR 53, is overwritten to be one as shown in FIG. 8B. The value of the bit 5 is not overwritten, since it can be left as the determined value of one. Additionally, values of the other bits are not overwritten. Since the detected angle data θd is changed again, the vector (Vx, Vy) is rotated clockwise by an angle of θ1+θ2=180 degrees+90 degrees by the vector rotation unit 40. This angle of θ1+θ2=180 degrees+90 degrees is a vector rotation amount corresponding to the change of the state from the state at the beginning where all the six bits of the SAR 53 are zero to a state where the values of the bit 5 and the bit 4 have been changed to be one. The components of the thus rotated vector are denoted by Vx'(2) and Vy'(2). The sequencer 51 detects the sign of Vy'(2) by the sign determination result (sign). In the example of FIG. 8B, the sign of Vy'(2) is minus. In this manner, when the sign of Vy'(2) is minus, the value of the bit 4 of the SAR 53 is restored and determined to be zero.

Figure 8C:
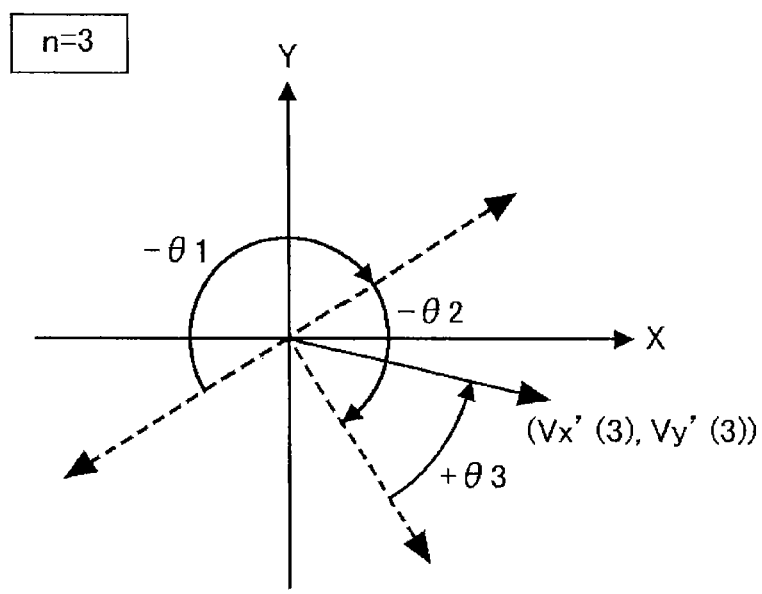
FIG. 8C is a diagram showing the operation of the angle search sequence (count n=3) according to the first embodiment.

When the next clock clk is received, the count n is set to be three as shown in FIG. 7, and a value of a bit 3, which is two bits from the most significant bit of the SAR 53, is overwritten to be one as shown in FIG. 8C. The values of the other bits (the bit 5 is one, the bit 4 is zero, and bits 2-0 are zero) are not overwritten. Since the detected angle data θd is changed again, the vector (Vx, Vy) is rotated clockwise by an angle of θ1+θ2−θ3=180 degrees+90 degrees−45 degrees by the vector rotation unit 40. The angle of θ1+θ2−θ3=180 degrees+90 degrees−45 degrees (=225 degrees) is equal to an angle of θ1+θ3=180 degrees+45 degrees (=225 degrees). Namely, the angle of θ1+θ2−θ3=180 degrees+90 degrees−45 degrees (=225 degrees) is a vector rotation amount corresponding to the change of the state from the state at the beginning where all the six bits of the SAR 53 are zero to a state where values of the bit 5 and the bit 3 have been changed to be one. The components of the thus rotated vector are denoted by Vx'(3) and Vy'(3). The sequencer 51 detects the sign of Vy'(3) by the sign determination result (sign). In the example of FIG. 8C, the sign of Vy'(3) is minus. In this manner, when the sign of Vy'(3) is minus, the bit 3 of the SAR 53 is restored and determined to be zero.

Figure 8D:
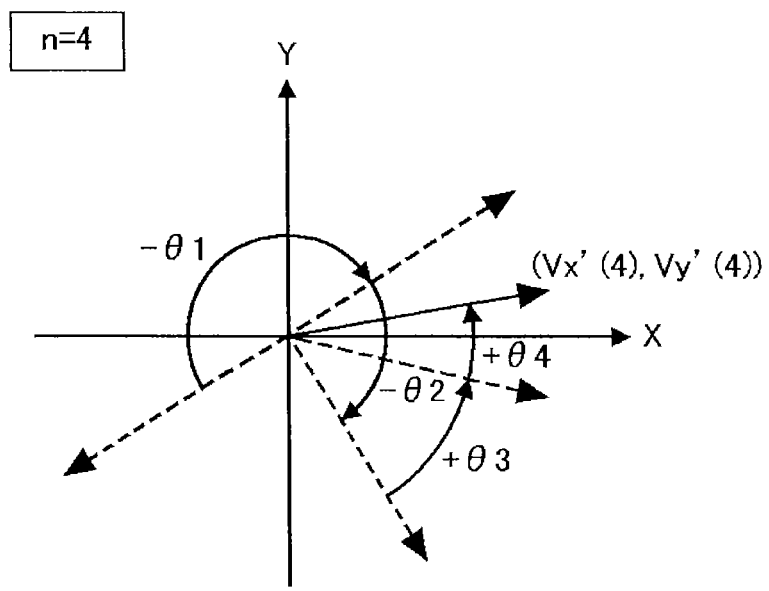
FIG. 8D is a diagram showing the operation of the angle search sequence (count n=4) according to the first embodiment.

When the next clock clk is received, the count n is set to be four as shown in FIG. 7, and a value of a bit 4, which is three bits from the most significant bit of the SAR 53, is overwritten to be one as shown in FIG. 8D. The values of the other bits (the bit 5 is one, the bits 4 and 3 are zero, and the bits 1 and 0 are zero) are not overwritten. Since the detected angle data θd is changed again, the vector (Vx, Vy) is rotated clockwise by an angle of θ1+θ2−θ3−θ4=180 degrees+90 degrees−45 degrees−22.5 degrees by the vector rotation unit 40. The angle of θ1+θ2−θ3−θ4=180 degrees+90 degrees−45 degrees−22.5 degrees (=202.5 degrees) is equal to an angle of θ1+θ4=180 degrees+22.5 degrees (=202.5 degrees). Namely, the angle of θ1+θ2−θ3−θ4=180 degrees+90 degrees−45 degrees−22.5 degrees (=202.5 degrees) is a vector rotation amount corresponding to the change of the state from the state at the beginning where all the six bits of the SAR 53 are zero to a state where values of the bit 5 and the bit 2 have been changed to be one. The components of the thus rotated vector are denoted by Vx'(4) and Vy'(4). The sequencer 51 detects the sign of Vy'(4) by the sign determination result (sign). In the example of FIG. 8D, the sign of Vy'(4) is plus. In this manner, when the sign of Vy'(4) is plus, the bit 2 of the SAR 53 is determined to be one, as it is.

The sequencer 51 repeats the above-described sequence six steps in total from the count n=1 to the count n=6. This corresponds to the word length of the SAR 53, and all the bits are determined. However, for the last step, since there is no step that follows the last step, when the value of the bit 0 of the SAR 53 is determined to be zero, the value of the bit 0 is overwritten to be zero.

To generalize the above-described operations of the sequencer 51, the rotational angle θn (n=1, 2, . . . , 6) of the vector (Vx'(n), Vy'(n)) is divided into halves for a next step. As to the direction of the rotation, when the rotated Y-axis component Vy' is plus, the vector (Vx, Vy) is rotated in the clockwise direction in the next step. On the other hand, when the rotated Y-axis component Vy' is minus, the vector (Vx, Vy) is rotated in the counterclockwise direction in the next step.

In the end, an angular position is obtained where the vector (Vx'(n), Vy'(n)) is rotated closest to the X-axis. In this manner, the total rotational angle in the angle search sequence is detected approximately as the angle between the vector (Vx, Vy) and the X-axis. This is an approximate search algorithm based on the bisection method.

Figure 20:
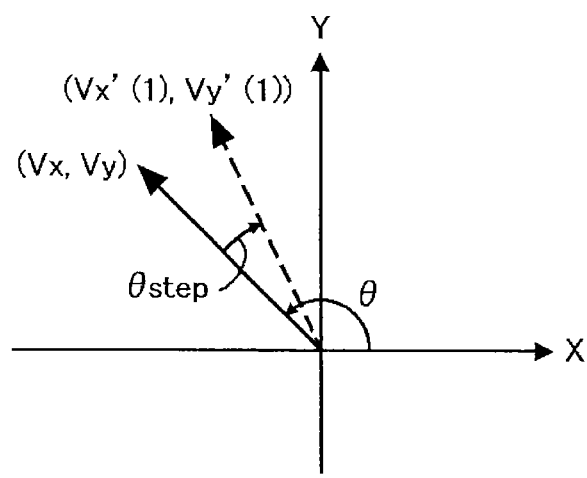
FIG. 20 is a diagram showing an example of an operation of a conventional angle search algorithm.

As described above, the detection angle data θd can be detected which indicates the rotational angle of the rotor 11 with respect to the phase of the X-axis, which is used as the reference. In the example which has been explained along with FIG. 20, the vector is rotated in the negative rotational direction by the predetermined step angle each time, and the rotational angle of the rotor is obtained by repeating the rotation until the sign of the Y component of the rotated vector is changed to be a negative value from a positive value. On the other hand, in the embodiment, as it has been explained along with FIGS. 7-8D, an amount of a subsequent rotation is reduced to be half the amount of the rotation in the previous step in accordance with the approximate search algorithm based on the bisection method. Each time the sign of the Y-component is changed as a consequence of the rotation, the direction of the rotation is reversed. The vector gradually approaches the X-axis by repeating the above processes (e.g., (Vx'(2), Vy'(2))→(Vx'(3), Vy'(3))→(Vx'(4), Vy'(4)), in FIGS. 8B-8D). As a result, as described above, the angular position is obtained in the end where the vector is rotated closest to the X-axis. The total rotational angle in the angle search sequence is the angle between the vector indicating the rotational angle of the rotor 11 and the X-axis. At this time, an angle of the rotor may be detected as the value obtained by adding a predetermined offset to the detected angle data θd. In such a case, the detected angle data θd indicates a rotational angle of the rotor 11 with respect to a reference, which is a predetermined phase other than the phase of the X-axis.

Next, there will be explained a configuration and operations of the two-phase pulse generator 65 as a unit for generating the two-phase pulses.

In accordance with the generating logic shown in FIG. 9, the two-phase pulse generator 65 updates two-phase pulse signals ENCA and ENCB to be output by referring to the lower order two bits of the detected angle data θd, each time the trigger fs is received from the frequency divider 63 (cf. ENCA and ENCB at the bottom of FIG. 7). In this manner, the two-phase signals that are shifted by a phase shift of a quarter period can be obtained without introducing an expensive optical encoder, which can be a cause of an increase of the cost. Therefore, the device may have a configuration which is less expensive. This point will be described later along with FIG. 21.

Next, there will be explained a configuration and operations of the Hall-element drive unit 70.

The Hall-element drive unit 70 outputs a Hall element drive signal Hdrv for driving the Hall element 15U for the U-phase and a Hall element drive signal HVdrv for driving the Hall element 15V for the V-phase, which are predetermined voltages or currents supplied from a power supply (not shown).

The Hall element drive signal HVdrv for the V-phase is generated by a peak value detector 71, a comparator 72, and a variable gain amplifier 73, which will be described below.

The peak value detector 71 functions as a unit for detecting amplitudes. The peak value detector 71 detects peak values of the corresponding sine waves of the analog Hall signals HAU and HAV, and outputs the corresponding peak values.

The comparator 72 functions as a unit for adjusting the amplitudes. The comparator 72 compares the peak value of the U-phase with the peak value of the V-phase. When the peak value of the U-phase is greater than the peak value of the V-phase, the comparator 72 outputs the result of the comparison so that the difference of the amplitude becomes a positive value. When the peak value of the U-phase is smaller than the peak value of the V-phase, the comparator 72 outputs the result of the comparison so that the difference of the amplitude becomes a negative value.

The variable gain amplifier 73 is a unit for adjusting the amplitudes. The variable gain amplifier 73 multiplies the Hall element drive signal Hdrv with a gain, and outputs the result as the Hall element drive signal HVdrv for the V-phase. At this time, the variable gain amplifier 73 varies the gain such that, when the comparison result output by the comparator 72 is a positive value, the gain is enlarged, and when the comparison result output by the comparator is a negative value, the gain is lowered. Here, an integrator may be used to integrate the comparison result. In such a case, the gain may be varied depending on the result of the integration.

The explanation is omitted for a configuration for outputting a Hall element drive signal for driving the Hall element 15W for the W-phase. However, the configuration is the same as the configuration for outputting the Hall element drive signal for driving the Hall element 15U for the U-phase or for driving the Hall element 15V for the V-phase.

The amplitudes of the analog Hall signals HAU and HAV are adjusted to be substantially equal to each other by the above-described configuration of the Hall-element drive unit 70.

The configuration and the operations of the angle detection device 20 according to the first embodiment have been described above.

In the first embodiment, the vector generating unit 30 generates the sinusoidal signals that are shifted one to another by the phase shift of 90 degrees by applying the operations that have been described above by referring to FIG. 5 to the sinusoidal signals output from the Hall elements 15U, 15V, and 15W included in the brushless motor 10. Here, the sinusoidal signals output from the Hall elements 15U, 15V, and 15W are shifted one to another by the phase shift other than 90 degrees. Therefore, the rotational angle of the rotor 11 can be detected without adding a new sensor.

Further since the rotational angle of the rotor 11 is searched for by using the approximate search algorithm based on the bisection method, the rotational angle of the rotor 11 can be stably detected by a predetermined number of steps by using a simple configuration. In addition, since the two-phase pulse generator 65 is included, the two-phase pulse signals can be obtained, where the two-phase pulse signals are equivalent to signals generated by an optical encoder, without including such an expensive optical encoder in the motor. This point will be explained later by referring to FIG. 21.

In addition, the angle detection device 20 includes the peak value detector 71 as the unit for detecting the amplitudes, and the angle detection device 20 includes the comparator 72 and the variable gain amplifier 73 as the units for adjusting the amplitudes. Therefore, the angle detection device 20 can detect with high precision the rotational angle.

Furthermore, by using the less expensive Hall elements 15U, 15V, and 15W as the sensors, the angle detection device 20 can be realized by a less expensive configuration.

Figure 10:
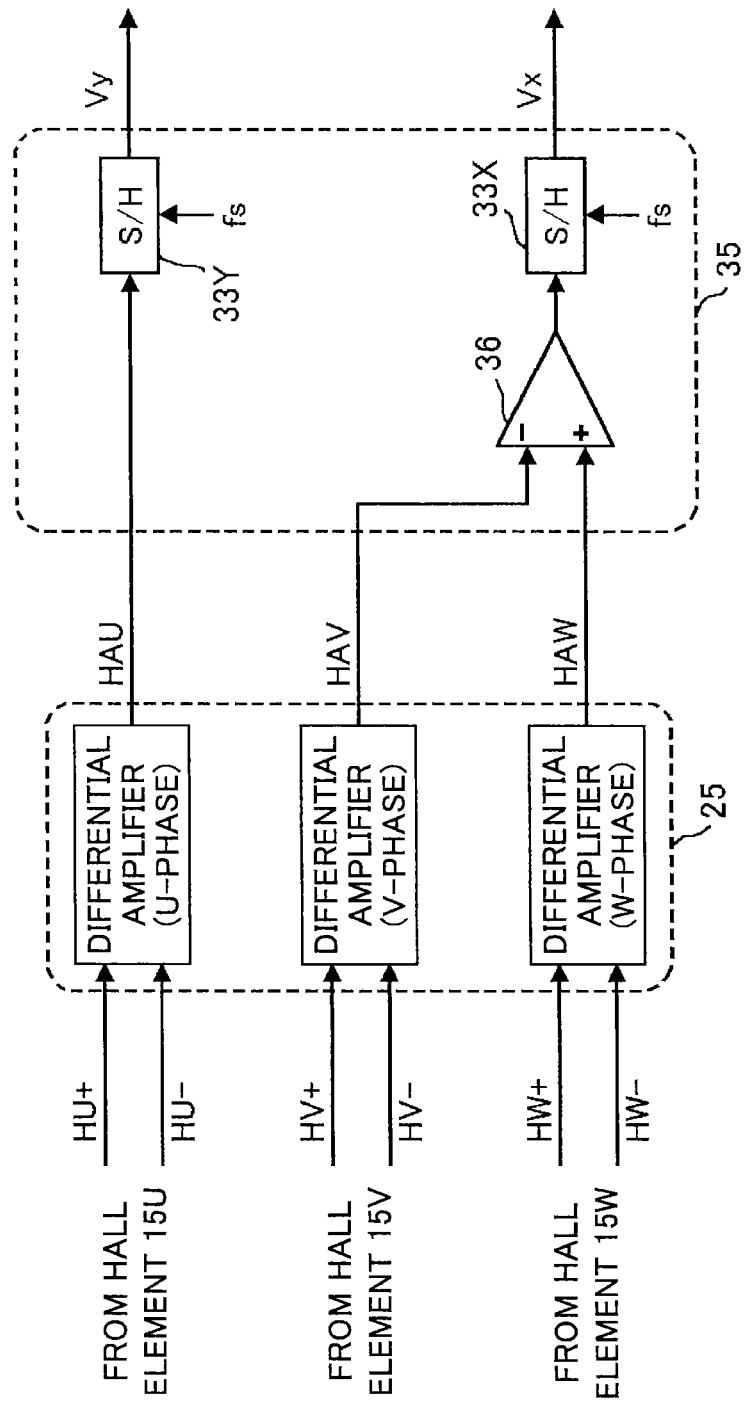
FIG. 10 is a configuration diagram of differential amplifiers and a vector generating unit according to a second embodiment.

Hereinafter, there will be explained a configuration of the angle detection device 20 according to a second embodiment of the present invention by referring to FIG. 10. Here, explanations that are common to those of the first embodiment will be appropriately omitted.

The configurations of the brushless motor 10; the Hall elements 15U, 15V, and 15W; the oscillator 62; the frequency divider 63; the two-phase pulse generator 65; the vector rotation unit 40; and the angle search control unit 50 are the same as those of the first embodiment. The configuration of the Hall-element drive unit 70 is also the same as that of the first embodiment. Therefore, the configuration for the W-phase is the same as that of the V-phase.

First, there will be explained a configuration and operations of a differential amplifier 25.

The differential amplifier 25 outputs the analog Hall signals HAU, HAV, and HAW by converting the differential signal HU+/HU− for the U-phase, the differential signal HV+/HV− for the V-phase, and the differential signal HW+/HW− for the W-phase into single end signals, respectively. At this time, the waveforms of the analog Hall signals HAU, HAV, and HAW are expressed by three sine functions having phases that are different from each other with respect to the rotational angle A of the rotor 11, as indicated in the formulae of "Expression 6." The formulae indicate differential output waveforms from the three-phase Hall element. The amplitudes of HAU, HAV, and HAW are denoted by Au, Av, and Aw, respectively.

$$\begin{cases} HAU = Au*\sin(\theta) \\ HAV = Av*\sin\left(\theta - \frac{2\pi}{3}\right) \\ HAW = Aw*\sin\left(\theta + \frac{2\pi}{3}\right) \end{cases} \quad \text{[Expression 6]}$$

Next, there will be explained a configuration and operations of a vector generating unit 35.

First, the vector generating unit 35, as a unit for generating vectors, sample-holds the analog Hall signal HAU as it is by the S/H unit 33Y at the timing of the trigger fs, as shown in the bottom formula of "Expression 7," and outputs the sample-held value as the Y-axis component Vy. On the other hand, the vector generating unit 35 sample-holds, by the S/H unit 33X, a result of multiplying a gain of 1/√3 with a result of subtracting, by a subtraction amplifier 36, the analog Hall signal HAV from the analog Hall signal HAW at the timing of the trigger fs, as shown in the left hand side of the upper formula of "Expression 7," and outputs the sample-held value as the X-axis component Vx.

$$\begin{cases} (HAW - HAV)/\sqrt{3} = Au * \cos(\theta) \\ HAU = Au * \sin(\theta) \end{cases} \text{(if } Au = Av = Aw\text{)} \quad \text{[Expression 7]}$$

By these operations, the X-axis output Vx and the Y-axis output Vy vary sinusoidally with respect to the rotational angle θ, while the X-axis output Vx and the Y-axis output Vy are shifted one to another by a phase shift of 90 degrees, as shown in FIG. 4. Here, the amplitudes Au, Av, and Aw of the analog Hall signals HAU, HAV, and HAW are adjusted to be substantially equal to each other by the amplitude adjustment of the Hall-element drive unit 70.

Figure 11:
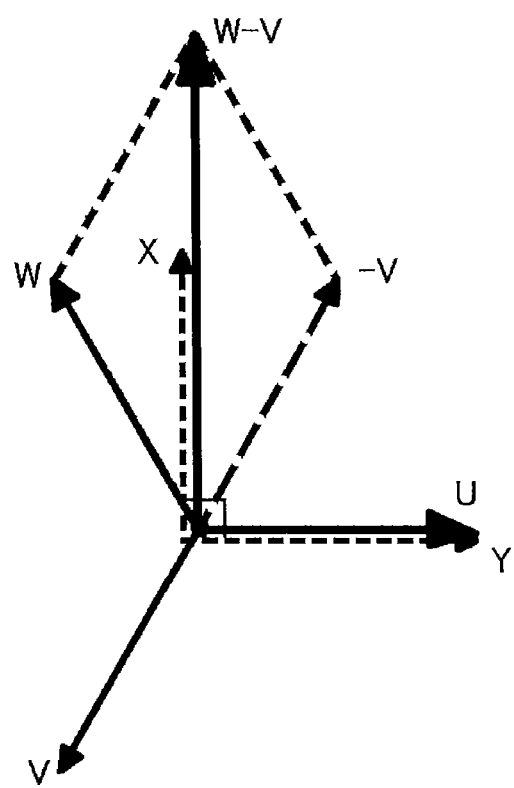
FIG. 11 is a diagram showing the transformation from the UVW axes to the XY axes according to the second embodiment.

Hereinafter, there will be explained the meanings of the operations indicated by the formulae of "Expression 7" by referring to FIG. 11.

In the orthogonal XY plane, the U-axis is defined to be in the same direction as the direction of the Y-axis, the V-axis is defined to be in the direction of −120 degrees with respect to the direction of the Y-axis, and the W-axis is defined to be in the direction of +120 degrees with respect to the direction of the Y-axis. When the unit vectors on the U-axis, V-axis, and W-axis, each having a length of one, are denoted by U, V, and W, respectively, the vector U is a unit vector on the Y-axis, and the vector W-V is a vector having a length of √3 on the X-axis. Namely, the formulae of "Expression 7," which show the mutual operations of HAU, HAV, and HAW, indicate a coordinate transformation from the coordinate system based on the U-axis, the V-axis, and the W-axis to the XY coordinate system. Here, the U-axis, V-axis, and W-axis are forming angles of 120 degrees with one another. The coefficient of 1/√3 is multiplied with HAW-HAV so as to equalize the transformed lengths.

The vector represented by the Y-axis component Vy and the X-axis component Vx is the vector represented by a sinusoidal signal and a result of mutually operating at least two sinusoidal signals. Namely, as it is clear from FIG. 4, the vector represented by the X-axis component Vx and the Y-axis component Vy is the vector represented by the right hand side of the formulae of "Expression 7," namely, the vector represented by Au*cos(θ) and Au*sin(θ). Further, as indicated in the left hand side of the formulae of "Expression 7," Au*cos(θ) is obtained from the operations (mutual operations), such as the subtraction of HAV from HAW, and Au*sin(θ) is HAU. Here, HAU, HAV, and HAW are the sinusoidal signals indicated in "Expression 6."

The configuration and the operations of the angle detection device 20 according to the second embodiment have been described above. The angle detection device 20 according to the second embodiment has an effect that is the same as the effect of the angle detection device 20 according to the first embodiment.

Next, there will be explained a configuration of a motor driving device 500 according to a third embodiment by referring to FIG. 12. However, explanations of the portions that are common to the first and second embodiments will be appropriately omitted.

The configurations of the brushless motor 10; the Hall elements 15U, 15V, and 15W; and the angle detection device 20 are the same as those of the first embodiment.

The angle detection device 20 is the angle detection device 20 according the above-described first embodiment. The angle detection device 20 outputs the two-phase pulse signals ENCA and ENCB in response to the change of the rotational angle of the rotor 11 (cf. FIGS. 1 and 9). The angle detection device 20 in FIG. 12 does not output the detected angle data θd. However, the angle detection device 20 may output the detected angle data θd. The thus output detected angle data θd may be utilized for controlling the position or driving the sinusoidal signals.

Figures 13, 14:
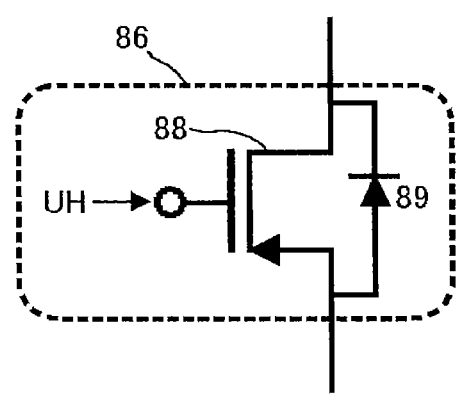
FIG. 13 is a diagram showing a condition for generating Hall signals.
FIG. 14 is a configuration diagram of an upper arm of a drive switching circuit.

A Hall comparator 83 is connected to the brushless motor 10 and the angle detection device 20. The Hall comparator 83 is a comparator that binarizes the differential signals of HU+/HU−, HV+/HV−, and HW+/HW− from the corresponding Hall elements 15U, 15V, and 15W in accordance with the logic indicated in FIG. 13. The Hall comparator 83 outputs the binarized signals as Hall signals HG (HU, HV, and HW). In FIG. 13, for example, when HU+ is greater than or equal to HU−, a High level signal is output as the Hall signal HG of the top column (HU). When HU+ is less than HU−, a Low level signal is output as the Hall signal HG of the top column (HU). The similar conditions are applied to the Hall signal HG(HV) and the Hall signal HG(HW).

As shown in FIGS. 12 and 14, a drive switching circuit 85 has a configuration in which an upper arm 86 and a lower arm 87 are connected. The upper arm 86 includes three sets of a switching element 88 and a diode 89. In each of the three sets, the switching element 88 is connected to a power supply Vcc, and the switching element 88 and the diode 89 are connected in parallel. The lower arm 87 has the same configuration as that of the upper arm 86. The lower arm is connected to ground GND. The switching elements 88 are driven by the corresponding gate signals (UH, VH, WH, UL, VL, and WL). The switching elements 88 apply pulse width modulated voltages to the corresponding coils 13U, 13V, and 13W of the brushless motor 10, thereby supplying driving currents to the corresponding coils 13U, 13V, and 13W. In this manner, the switching elements 88 rotationally drive the brushless motor 10.

A modulator 80 applies the pulse width modulation (hereinafter it is referred to as "PWM") to a drive voltage command value Vamp*, and generates PWM-phase gate signals XH and XL based on predetermined logic.

Hereinafter, operations of the modulator 80 will be explained by referring to FIG. 15.

Figure 15:
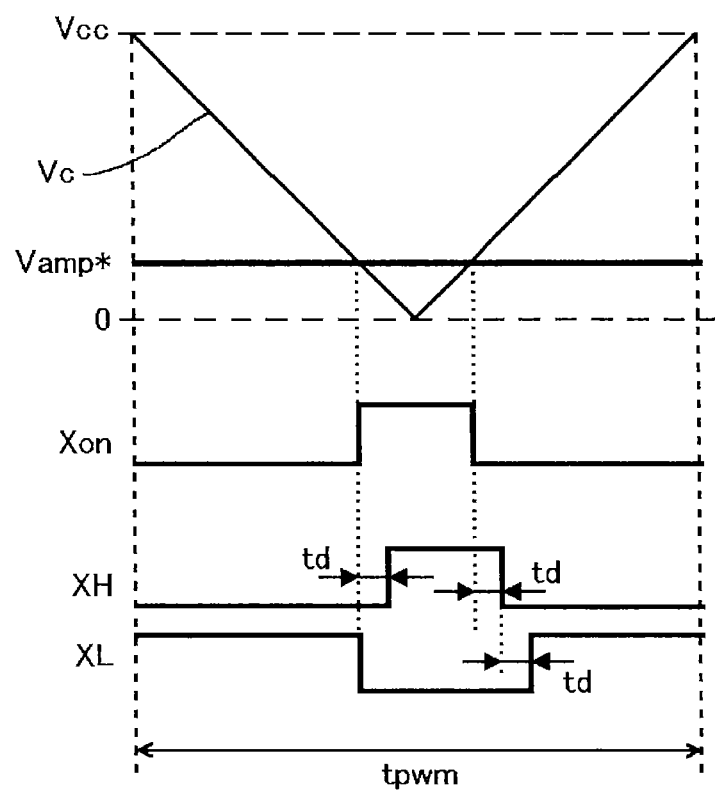
FIG. 15 is a diagram showing an operation of a modulator.

The carrier wave Vc shown at the top portion of FIG. 15 is a triangular wave having a predetermined PWM period. The carrier wave Vc has an amplitude corresponding to the range from ground GND to the power supply voltage Vcc. The modulator 80 determines whether an amplitude command value Vamp* is greater than the carrier wave Vc, thereby generating a PWM signal Xon shown at the second portion from the top in FIG. 15.

Next, the modulator 80 generates a PWM-phase gate signal XH for the switching elements 88 included in the upper arm 86. The PWM-phase gate signal XH is delayed from the PWM signal Xon by a time interval of td. Further, the modulator 80 generates a PWM-phase gate signal XL for the switching elements 88 included in the lower arm 87. The PWM-phase gate signal XL is a signal generated by inverting the PWM signal Xon and delaying a rising edge (corresponds to a lowering edge of Xon) by a time interval that is twice as much as the time interval td. Here, the time interval td is a time period for preventing short circuiting (dead time) that is provided so as to prevent short circuiting between the switching elements 88 included in the upper arm 86 and the switching elements 88 included in the lower arm 87. In FIG. 15, a time period tpwm is a length of the PWM period (the period of the carrier wave Vc).

Next, there will be explained a configuration and operations of a switching controller 81.

When the PWM-phase gate signals XH and XL are input to the switching controller 81, the switching controller 81 selects and outputs suitable gate signals corresponding to the U-phase, V-phase, and W-phase, based on the High/Low logic of the Hall signals HG (HU, HV, and HW).

Figure 16:
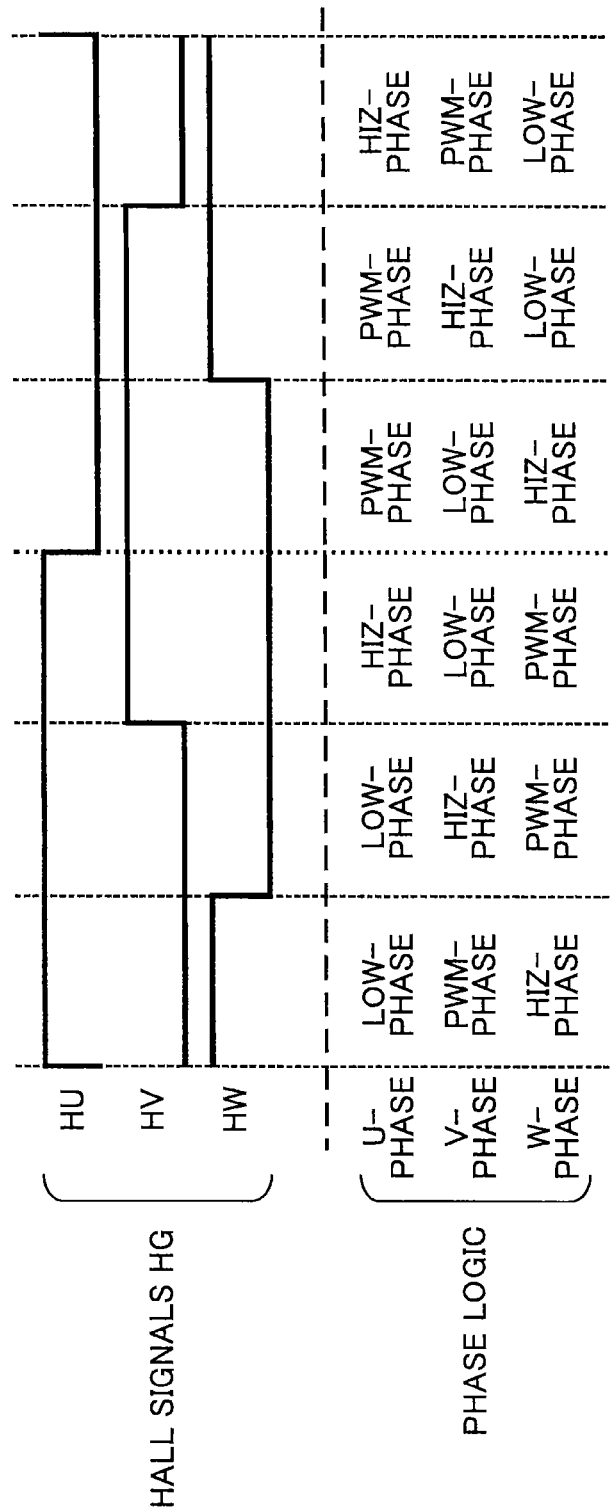
FIG. 16 is a diagram showing temporal logic of the Hall signals and rectangular-wave driving.

In order to rotationally drive the motor by driving rectangular waves, the switching controller 81 assigns phase states of a PWM phase, a LOW phase, and a HiZ phase to the U-phase, the V-phase, and the W-phase, in accordance with a state of the Hall signals HG as shown in FIG. 16. Subsequently, the switching controller 81 outputs gate signals corresponding to the phase states. The gate signals will be explained below.

Namely, as shown in FIG. 17, when the phase state is the PWM state, the switching controller 81 selects XH as a gate signal YH for the upper arm 86 and XL as a gate signal YL for the lower arm 87. When the phase state is the LOW phase, the switching controller 81 always selects Lo (Low) as the gate signal YH for the upper arm 86 and Hi (High) as the gate signal YL for the lower arm 87. When the phase state is the HiZ phase, the switching controller 81 always selects Lo (Low) as the gate signal YH for the upper arm 86 and Lo (Low) as the gate signal YL for the lower arm 87. For each of the switching elements 88 included in the drive switching circuit 85, when the gate signal applied to the switching element 88 is Hi, the switching element 88 is conductive, and when the gate signal applied to the switching element 88 is Lo, the switching element 88 is blocked. Incidentally, the gate signals YH and YL are the gate signals UH and UL for the case of the U-phase, the gate signals VH and HL for the case of the V-phase, and the gate signals WH and WL for the case of the W-phase (cf. FIG. 12).

These selections are simultaneously updated for all the three phases at the start of the PWM period. When the rotational direction is to be inverted, the PWM phase and the LOW phase are exchanged in FIG. 16 and the phases are selected. Hereinafter, there will be explained one example of current switching operations by the drive switching circuit 85.

For example, in FIG. 16, the phase logic of the first PWM period is such that the U-phase is the LOW phase, the V-phase is the PWM phase, and the W-phase is the HiZ phase. In this case, in the U-phase, the switching element 88 included in the upper arm 86 is blocked and the switching element 88 included in the lower arm 87 is conductive, in accordance with the conditions of FIG. 17. Further, in the V-phase, the switching element 88 included in the upper arm 86 is conductive for a first time interval, and the switching element 88 included in the lower arm 87 is blocked for a second time interval. Here, the first time interval is included in the second time interval. In the W-phase, both the switching element 88 included in the upper arm 86 and the switching element 88 included in the lower arm 87 are blocked. Consequently, in this case, a driving current flows from the coil 13V for the V-phase to the coil 13U for the U-phase through the switching element 88 for the V-phase included in the upper arm 86 and the switching element 88 for the U-phase included in the lower arm 87, during the above-described first time interval. As a consequence, torque is generated by the interaction between a magnetic field generated by the driving current flowing through the coils 13V and 13U and a magnetic field of the permanent magnet of the rotor 11 shown in FIG. 2, and thereby the rotor 11 is driven.

In FIG. 16, the phase logic for the next (second) PWM period is such that the U-phase is the LOW phase, the V-phase is the HiZ phase, and the W-phase is the PWM phase. In this case, similar to the above-described current switching operations, during a time period in which the switching element 88 for the W-phase included in the upper arm 86 is conductive, a driving current flows from the coil 13W for the W-phase to the coil 13U for the U-phase through the switching element 88 for the W-phase included in the upper arm 86 and the switching element 88 for the U-phase included in the lower arm 87. Consequently, torque is generated by the interaction between a magnetic field generated by the driving current flowing through the coils 13W and 13U and a magnetic field of the permanent magnet of the rotor 11 shown in FIG. 2, and thereby the rotor 11 is driven.

In FIG. 16, the phase logic for the further next (third) PWM period is such that the U-phase is the HiZ phase, the V-phase is the LOW phase, and the W-phase is the PWM phase. In this case, similar to the above-described current switching operations, during a time period in which the switching element 88 for the W-phase included in the upper arm 86 is conductive, a driving current flows from the coil 13W for the W-phase to the coil 13V for the V-phase through the switching element 88 for the W-phase included in the upper arm 86 and the switching element 88 for the V-phase included in the lower arm 87. Consequently, torque is generated by the interaction between a magnetic field generated by the driving current flowing through the coils 13W and 13V and a magnetic field of the permanent magnet of the rotor 11 shown in FIG. 2, and thereby the rotor 11 is driven.

Subsequently, in the fourth PWM period in FIG. 16, during a time period in which the switching element 88 for the U-phase included in the upper arm 86 is conductive, a driving current flows from the coil 13U for the U-phase to the coil 13V for the V-phase through the switching element 88 for the U-phase included in the upper arm 86 and the switching element 88 for the V-phase included in the lower arm 87. In the fifth PWM period, during a time period in which the switching element 88 for the U-phase included in the upper arm 86 is conductive, a driving current flows from the coil 13U for the U-phase to the coil 13W for the W-phase through the switching element 88 for the U-phase included in the upper arm 86 and the switching element 88 for the W-phase included in the lower arm 87. In the sixth PWM period, during a time period in which the switching element 88 for the V-phase included in the upper arm 86 is conductive, a driving current flows from the coil 13V for the V-phase to the coil 13W for the W-phase through the switching element 88 for the V-phase included in the upper arm 86 and the switching element 88 for the W-phase included in the lower arm 87. Subsequently, the pattern of the sequence of the PWM periods (six periods) shown in FIG. 16 is repeated. In this manner, the rotor 11 is continuously rotationally driven by the driving currents that are caused to appropriately flow through the corresponding coils 13U, 13V, and 13W by the current switching operations of the drive switching circuit 85.

The configuration and the operations of the motor driving device 500 according to the third embodiment have been described above.

Hereinafter, in order to explain an effect of the motor driving device 500 according to the third embodiment, and for the purpose of comparison, there will be explained a configuration of a conventional motor driving device 510 by referring to FIG. 21. However, explanations of the portions that are common to the motor driving device 500 according to the third embodiment will be omitted.

Figure 21:
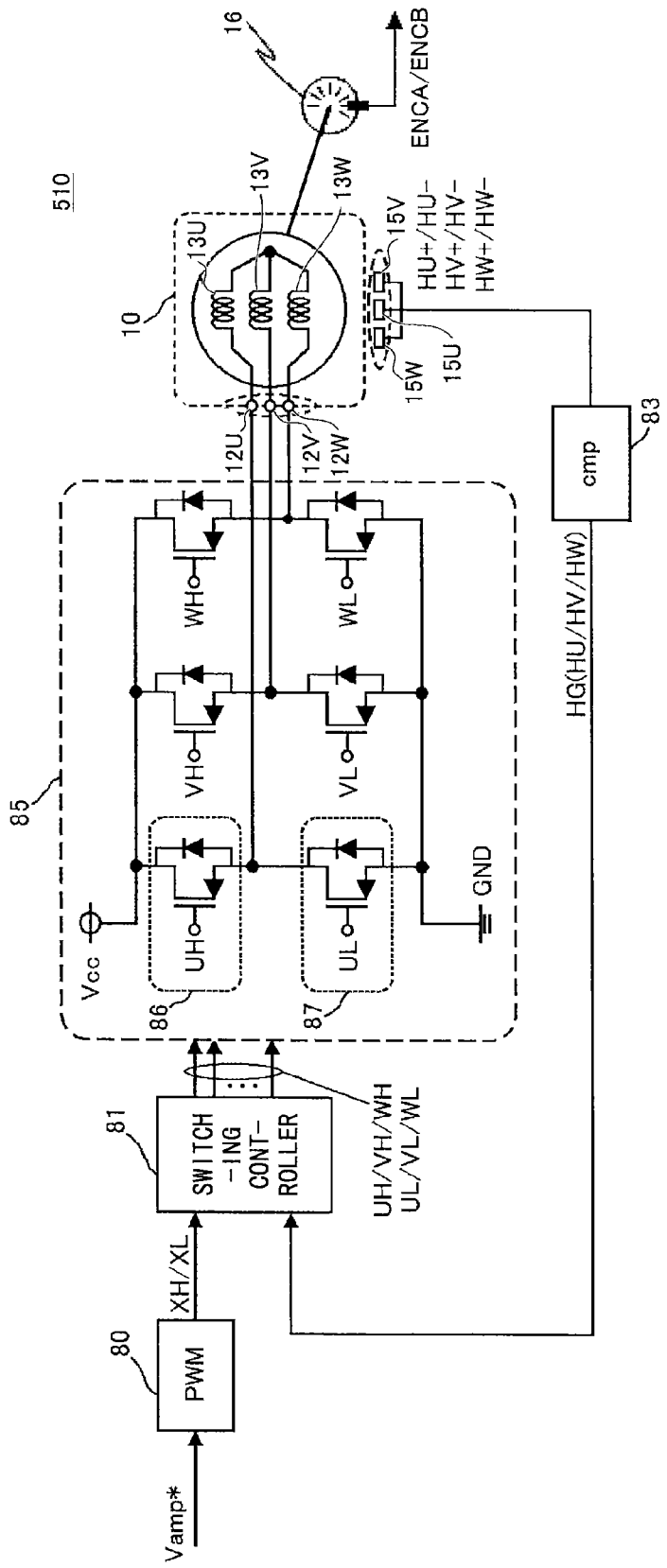
FIG. 21 is a diagram showing an overall configuration of a conventional motor driving device.

In the configuration shown in FIG. 21, the brushless motor 10; the Hall elements 15U, 15V, and 15W; the modulator 80; the switching controller 81; the Hall comparator 83; and the drive switching circuit 85 are the same as those of the motor driving device 500 according to the third embodiment, which is shown in FIG. 12.

In FIG. 21, an encoder 16 is an optical encoder. The encoder 16 includes a disk, which is connected to the rotational shaft of the brushless motor 10, and two photo interrupters. In the disk, slits are arranged in the periphery while the slits are evenly spaced apart. The slits function as optical windows. The two photo interrupters are disposed while separated by a distance of a quarter of the slit pitch of the disk. The encoder 16 outputs two-phase pulse signals ENCA and ENCB, which vary in accordance with the rotation of the brushless motor 10, by binarizing the output signals from the two photo interrupters. Incidentally, the two-phase pulse signals output by the angle detection device 20 included in the motor driving device 500 according to the third embodiment, which is shown in FIG. 12, are equivalent to the two-phase pulse signals output by the above-described encoder 16.

The above is the configuration of the conventional motor driving device 510.

In the motor driving device 500 according to the third embodiment, which is shown in FIG. 12, the output signals from the Hall elements 15U, 15V, and 15W are used for the purposes described below. Here, the Hall elements 15U, 15V, and 15W are included in the motor driving device 500 for switching currents and driving the brushless motor 10. Similar to the example of the conventional motor driving device 500 in FIG. 21, the output signals from the Hall elements 15U, 15V, and 15W are used for detecting timing for switching a current by the Hall comparator 83, the switching controller 81, the drive switching circuit 85, and the modulator 80. Additionally, the output signals from the Hall elements 15U, 15V, and 15W are used for detecting the rotational angle by the angle detection device 20. Consequently, another sensor such as the encoder 16 shown in FIG. 21 is not required. Therefore, a less expensive motor driving device can be realized such that it includes a configuration for detecting rotational angles, besides a configuration for detecting timing to switch a current. Here, "the configuration for detecting timing to switch a current" is, for example, for the case of the third embodiment of FIG. 12, the configuration including the Hall comparator 83, the switching controller 81, the drive switching circuit 85, and the modulator 80. Similarly, "the configuration for detecting rotational angles" is, for example, the configuration including the angle detection device 20.

Finally, there will be explained an example of an image forming apparatus to which the motor driving device 500 according to the embodiment of the present invention can be applied.

Figure 18:
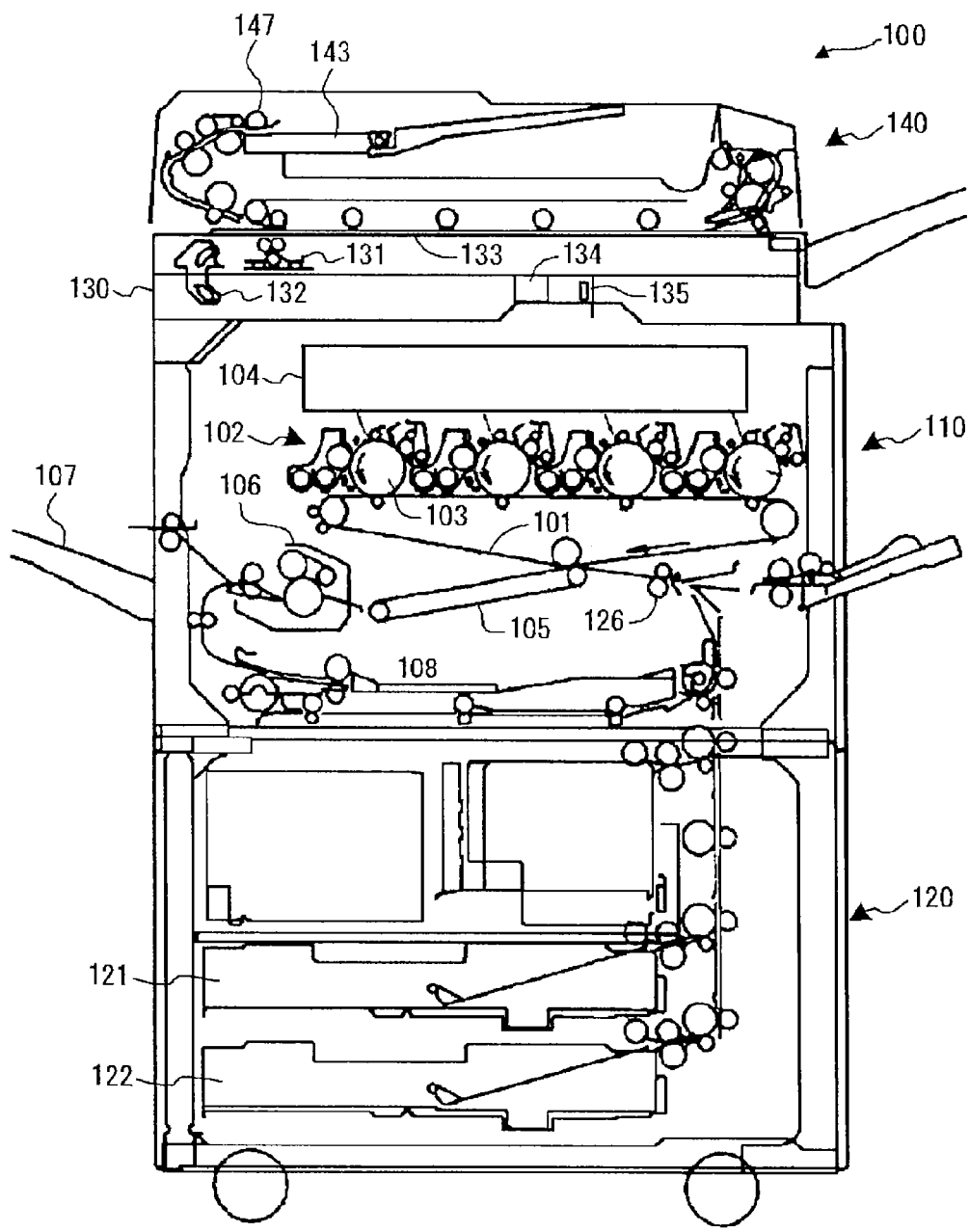
FIG. 18 is a cross-sectional configuration diagram showing an example of an image forming apparatus to which an embodiment of the present invention is applied.
Figure 19:
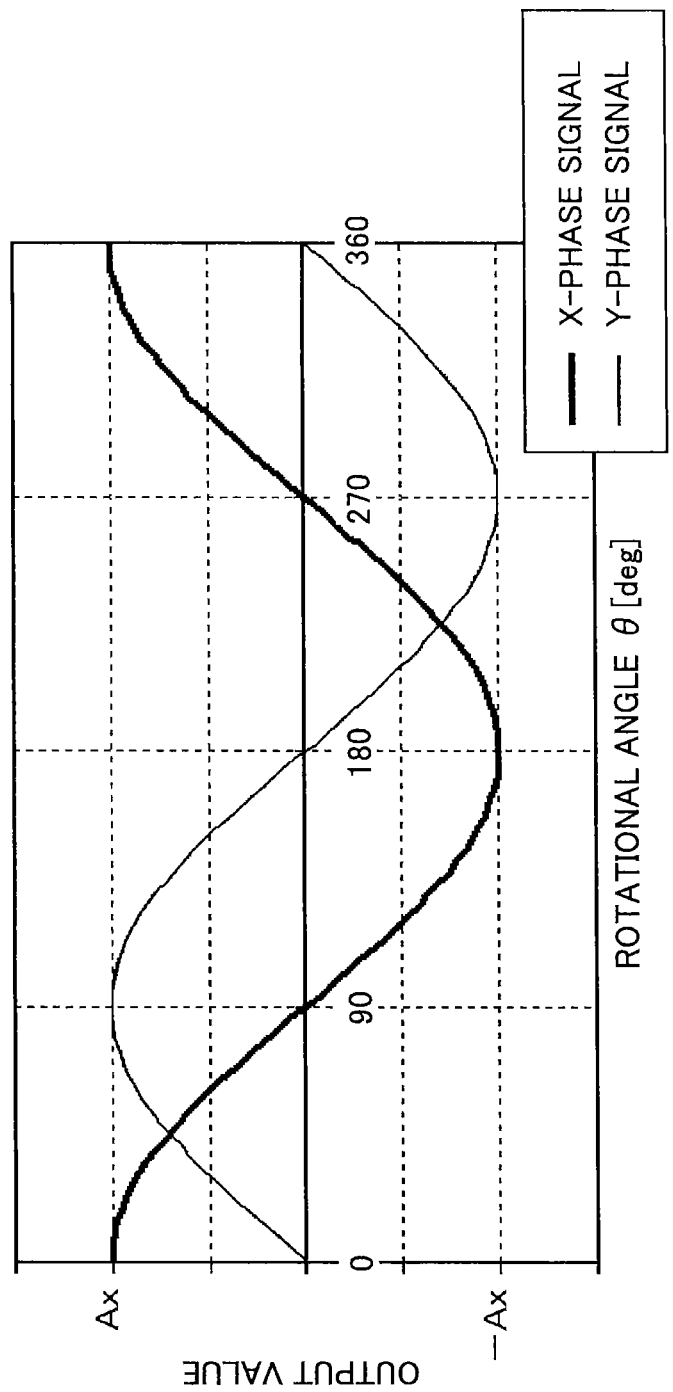
FIG. 19 is a diagram showing waveforms of two-phase sinusoidal signals having a phase shift of 90 degrees.

The image forming apparatus 100 shown in FIG. 18 is a tandem type full-color apparatus including an image reading unit. The image forming apparatus 100 has a configuration as a copy machine. The copy machine according to this example includes an apparatus main body 110; a paper feed table 120; a scanner 130; and an automatic document feeder (ADF) 140. The apparatus main body 110 is disposed on the paper feed table 120. The scanner 130 is disposed at the top-most portion of the apparatus main body 110. The ADF 140 is disposed on the scanner 130.

The scanner 130 includes therein a first traveling body 131 and a second traveling body 132. The first traveling body 131 includes a lighting source and a mirror. The second traveling body 132 includes a mirror. The first traveling body 131 and the second traveling body 132 are movable in parallel with a contact glass 133. As the second traveling body 132, a known optical system is adopted. The known optical system moves at a speed that is a half of a moving speed of the first traveling body 131. The first and second traveling bodies 131 and 132 scan an original image held on the contact glass 132, while they are being moved. A condensing lens 134 forms an image from reflected light from the original document, which is irradiated by the lighting source. The image is captured by a solid state imaging device 135 such as a CCD. The data of the image is processed by an image processor (not shown) included in the apparatus main body 110 of the copy machine.

An intermediate transfer belt 101 is disposed substantially in the center of the apparatus main body 110 of the copy machine. Four imaging units 102 are arranged along an upper side of the intermediate transfer belt 101. Each of the imaging units 102 includes a photosensitive drum 103 and various elements for electrophotographic processes disposed in the vicinity of the photosensitive drum 103.

The intermediate transfer belt 101 is supported by plural support rollers. The intermediate transfer belt 101 can be rotated in the clockwise direction in the figure. Inside the intermediate transfer belt 101, a transfer roller is disposed at a position facing the photosensitive drum 103 of each of the imaging units.

An exposing device 104 is disposed above the imaging units 102. The writing light from the exposing device 104 is irradiated onto the photosensitive drums 103 of the corresponding imaging units 102.

A transfer conveyance belt 105 is disposed below the intermediate transfer belt 101. One of rollers that supports the transfer conveyance belt 105 functions as a secondary transfer roller, and it secondary transfers an image on the intermediate transfer belt 101 onto a recording medium (e.g. a transfer paper).

A fixing device 106 is disposed at a left side of the transfer conveyance belt 105. At a left side of the fixing device 106, a paper discharge tray 107 is disposed on a side of the apparatus. Further, a sheet reversing unit 108 is disposed at the bottom most portion of the apparatus main body 110. The paper feed table 120 includes two-stage paper feed cassettes 121 and 122.

When a copy is taken using the color copy machine according to this example, a user sets an original document on a document table of the ADF 140 or on the contact glass 133 of the scanner 130. When a start switch disposed on an operations panel (not shown) is pressed, the scanner 130 is driven. Light from the lighting source is reflected by the original document. The mirror reflects the reflected light. Subsequently, the reflected light enters a reading sensor (the imaging device 135) through the condensing lens 134, and thereby information regarding the original document is read.

Further, when the start switch disposed on the operations panel is pressed, the intermediate transfer belt 101 is driven by a drive motor (not shown). At the same time, the photosensitive bodies 103 of the corresponding imaging units 102 are rotated, and single-color toner images of black, yellow, magenta, and cyan are formed on the corresponding photosensitive drums 103. Subsequently, the single-color images are sequentially transferred and superposed onto the intermediate transfer belt 101, thereby forming a synthesized color image.

The brushless motor 120 can be utilized as the drive motor (not shown) that rotationally drives the intermediate transfer belt 101. Here, the brushless motor 120 is driven by the motor driving device 500 according to the third embodiment, which has been described along with FIG. 12. Thus, as a motor driving device that drives the brushless motor 10 as the drive motor, the above-described motor driving device 500 according to the third embodiment can be used. In this case, the motor driving device 500 according to the third embodiment is included in the image forming apparatus 100, though it is not shown in FIG. 18.

Further, when the start switch is pressed, a sheet of paper is fed from the paper feed table 120. When the sheet of paper has reached a registration roller 126, the sheet of paper is temporarily stopped.

Subsequently, the registration roller 126 is rotated in synchronization with timing of the synthesized color toner image on the intermediate transfer belt 101. The sheet of paper is fed to a nip between the intermediate transfer belt 101 and the transfer conveyance belt 105. The image is transferred by the secondary transfer roller, and thereby the color toner image is recorded onto the sheet of paper. Subsequent to the transfer of the image, the sheet of paper is conveyed to the fixing device 106. The toner image on the sheet of paper is fixed by the fixing device 106, and the sheet of paper is ejected onto the paper discharge tray 107.

In the above description, the angle detection device, the motor driving device, and the image forming apparatus have been explained by the embodiments. However, the present invention is not limited to the above-described embodiments, and various modifications and improvements may be made within the scope of the present invention. For example, the motor is not limited to the outer rotor type motor. An inner rotor type motor may be used. The wiring pattern of the coil is not limited to the Y-shaped connection (star connection). For example, a delta connection may be used. The number of the poles included in the rotor of the motor is not limited to eight.

The motor driving device may suitably be applied to home appliances and office automation apparatuses. The office automation apparatuses are not limited to the above-described image forming apparatus. For example, the motor driving device may be applied to an image reading apparatus.

Further, in the image forming apparatus, the configurations of the imaging units are arbitrary. For example, the order of the imaging units of the tandem type is arbitrary. Further, the type of the image forming apparatus is not limited to the tandem type. For example, a configuration may be adopted where plural developing devices are disposed around a single photosensitive body. Alternatively, a configuration may be adopted where a revolver type developing device is utilized. Further, the image forming apparatus may be a full color image forming apparatus in which three colors of toner are utilized, a multi-color image forming apparatus in which two colors of toner are utilized, or a monochrome image forming apparatus. The image forming apparatus is not limited to the copy machine. The image forming apparatus may be a compound apparatus including a printer, a facsimile machine, and other multiple functions.

The present application is based on Japanese Priority Applications No. 2011-233788 filed on Oct. 25, 2011 and No. 2012-194012 filed on Sep. 4, 2012, the entire contents of which are hereby incorporated herein by reference.

What is claimed is:

1. An angle detection device comprising:
   plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor;
   a vector generating unit configured to generate a vector represented by a result of mutually operating at least two of the sinusoidal signals;
   a vector rotation unit configured to rotate the vector by operating the vector and reference sine waves having corresponding phases; and
   an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

2. The angle detection device according to claim 1,
   wherein the vector generating unit is configured to perform a coordinate transformation from a first coordinate system based on three first axes to a second coordinate system based on two second axes, and
   wherein a first angle between each two of the three first axes is 120 degrees, and a second angle between the two second axes is 90 degrees.

3. The angle detection device according to claim 1, further comprising:
   a two-phase pulse generator configured to generate two-phase pulse signals based on the detected rotational angle,
   wherein the two-phase pulse signals are shifted by a phase shift of a quarter of a period of the two-phase signals one to another, and the two-phase pulse signals vary depending on the rotational angle of the rotor of the motor.

4. The angle detection device according to claim 1,
   wherein the angle search unit is configured to detect the angle between the vector prior to being rotated and the predetermined phase by a bisection method.

5. The angle detection device according to claim 1, further comprising:
   an amplitude detecting unit configured to detect amplitudes of the corresponding sinusoidal signals; and
   an amplitude adjusting unit configured to adjust the amplitudes of the corresponding sinusoidal signals to be desired values, based on the amplitudes that have been detected.

6. The angle detection device according to claim 1,
   wherein the plural sensors are plural Hall elements.

7. A motor driving device configured to rotationally drive a motor by applying periodically varying driving voltages to terminals of the motor, the motor driving device comprising:
   an angle detection device including
   plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor;
   a vector generating unit configured to generate a vector represented by a result of mutually operating at least two of the sinusoidal signals;
   a vector rotation unit configured to rotate the vector by operating the vector and reference sine waves having corresponding phases; and
   an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

8. The motor driving device according to claim 7,
   wherein the plural sensors are disposed in the vicinity of the rotor of the motor, and
   wherein the motor driving device is configured to switch electric currents applied to the motor, based on output signals from the corresponding sensors.

9. An image forming apparatus comprising:
a motor driving device configured to rotationally drive a motor by applying periodically varying driving voltages to terminals of the motor,
wherein the motor driving device includes an angle detection device,
wherein the angle detection device includes
plural sensors configured to output corresponding sinusoidal signals, wherein each of the sinusoidal signals varies sinusoidally depending on a rotational angle of a rotor of a motor, and each of the sinusoidal signals has a phase that depends on a position of the corresponding sensor;
a vector generating unit configured to generate a vector represented by a result of mutually operating at least two of the sinusoidal signals;
a vector rotation unit configured to rotate the vector by operating the vector and reference sine waves having corresponding phases; and
an angle search unit configured to cause the vector rotation unit to sequentially rotate the vector until a phase of the vector becomes a predetermined phase, and configured to detect an angle between the vector prior to being rotated and the predetermined phase as the rotational angle of the rotor of the motor.

* * * * *